(12) United States Patent
Xue et al.

(10) Patent No.: US 11,356,209 B2
(45) Date of Patent: Jun. 7, 2022

(54) METHOD AND DEVICE FOR SENDING MULTIPLE RESPONSES

(71) Applicant: HUAWEI TECHNOLOGIES CO., LTD., Guangdong (CN)

(72) Inventors: Yifan Xue, Beijing (CN); Da Wang, Shenzhen (CN); Yun Liu, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 16/764,186

(22) PCT Filed: Oct. 27, 2018

(86) PCT No.: PCT/CN2018/112260
§ 371 (c)(1),
(2) Date: May 14, 2020

(87) PCT Pub. No.: WO2019/095971
PCT Pub. Date: May 23, 2019

(65) Prior Publication Data
US 2020/0382244 A1    Dec. 3, 2020

(30) Foreign Application Priority Data

Nov. 17, 2017   (CN) .......................... 201711148343.2

(51) Int. Cl.
*H04L 1/18* (2006.01)
*H04L 1/00* (2006.01)
(Continued)

(52) U.S. Cl.
CPC .......... *H04L 1/1812* (2013.01); *H04L 1/0041* (2013.01); *H04L 1/0057* (2013.01); *H04L 1/1607* (2013.01); *H04L 5/0055* (2013.01)

(58) Field of Classification Search
CPC ... H04L 5/0055; H04L 5/0094; H04L 1/1812; H04L 1/1607; H04L 1/0041; H04L 1/0057; H04L 1/18; G06F 12/128; G06F 12/089

See application file for complete search history.

(56) References Cited

U.S. PATENT DOCUMENTS

2011/0199961 A1    8/2011  Narasimha et al.
2018/0375634 A1*  12/2018  Sun ........................... H04L 1/06
(Continued)

FOREIGN PATENT DOCUMENTS

CN    101667900 A    3/2010
CN    106788918 A    5/2017
(Continued)

OTHER PUBLICATIONS

R1-1717074 Huawei, HiSilicon, "On CBG-based (re)transmission", 3GPP TSG RAN WG1 Meeting 90bis, Prague, Czech Republic, Oct. 9-13, 2017, total 8 pages.
(Continued)

*Primary Examiner* — Wei Zhao

(57) ABSTRACT

A communication method and a communications device are disclosed. A first device in a communications system separately sends, to a second device, responses used to indicate a transmission result of target data: a first response and a second response. An indication manner of the first response is different from an indication manner of the second response. This approach can improve flexibility of a response indication manner. Therefore, the communications system can flexibly adjust indication manners of responses sent at different times to ensure indication precision of the responses while reducing transmission resources of the responses.

16 Claims, 15 Drawing Sheets

(51) Int. Cl.
*H04L 1/16* (2006.01)
*H04L 5/00* (2006.01)

(56) References Cited

U.S. PATENT DOCUMENTS

2019/0379489 A1* 12/2019 Hwang ................. H04L 1/1819
2020/0235759 A1*  7/2020 Ye ........................ H03M 13/116
2021/0105098 A1*  4/2021 Matsuda ............... H04L 1/1896

FOREIGN PATENT DOCUMENTS

CN   106888074 A   6/2017
CN   107196740 A   9/2017

OTHER PUBLICATIONS

Extended European Search Report dated Oct. 26, 2020, issued in EP Application No. 18878590.1, total 10 pages.
R1-1717856 Lenovo et al., "Remaining issues on CBG-based (re)transmission", 3GPP TSG RAN WG1 Meeting 90bis, Prague, CZ, Oct. 9-13, 2017, total 4 pages.
R1-1717042 ZTE, Sanechips, "On the support of TB-based HARQ A_N fallback for CBGs", 3GPP TSG RAN WG1 Meeting 90bis, Prague, CZ, Oct. 9-13, 2017, total 9 pages.
R1-1717720 Fujitsu, "Discussion on HARQ-ACK feedback for DL CBG based (re)transmission", 3GPP TSG RAN WG1 Meeting #90bis, Prague, Czech Republic, Oct. 9-13, 2017, total 13 pages.
R1-1716135 Fraunhofer HHI, "HARQ-ACK Feedback for CBG-based (re-)transmission", 3GPP TSG-RAN1-NR#3, Nagoya, Japan, Sep. 18-21, 2017, total 4 pages.
3GPP, "RAN1 Chairman's Notes", 3GPP TSG RAN WG1 Meeting #90, Prague, Czech Republic, Aug. 21-25, 2017, total 143 pages.

* cited by examiner

METHOD AND DEVICE FOR SENDING MULTIPLE RESPONSES

CROSS-REFERENCE TO RELATED APPLICATION(S)

This application is a national stage of International Application No. PCT/CN2018/112260, filed on Oct. 27, 2018, which claims priority to Chinese Patent Application No. 201711148343.2, filed on Nov. 17, 2017. Each of these applications are hereby incorporated by reference in their entireties.

TECHNICAL FIELD

This application relates to the field of communications technologies, and in particular, to a communication method and a communications device.

BACKGROUND

In a long term evolution (LTE) system, data is transmitted between a base station and a terminal device based on a transport block (TB). Therefore, in the LTE system that supports a hybrid automatic repeat request (HARQ) technology, after receiving a data packet of a TB, a receiving device sends a response (for example, an acknowledgement/negative acknowledgement (ACK/NACK)) to a sending device to notify the sending device of a status of receiving (or decoding) the TB by the receiving device, so that the sending device determines, based on the receiving status of the TB, whether to retransmit the TB.

In the response, a payload of one bit may be used to indicate the receiving status of the TB. For example, when a value of the bit is 1 (that is, the response is a success response (for example, an ACK)), it indicates that the TB is received successfully; or when a value of the bit is 0 (that is, the response is a failure response (for example, a NACK)), it indicates that the TB fails to be received.

In the foregoing TB-based data transmission process, if a small part of the entire TB is received incorrectly, the entire TB is retransmitted. This wastes transmission resources. To resolve this problem, a data transmission technology based on a code block group (CBG) is introduced in a fifth-generation wireless access system—a new radio (NR) system. In the NR system, a TB to be sent by a sending device includes N CBGs. In this case, when some CBGs in the TB fail to be received due to a cause such as a poor channel status, the sending device retransmits only this part of CBGs that fail to be received. Compared with a TB-based data transmission technology, this technology can reduce retransmission overheads of the sending device, thereby saving transmission resources.

However, in a CBG-based data transmission process, when feeding back a response for the TB sent by the sending device each time, the receiving device needs to use a specified indication manner, to ensure that a payload in the feedback response can indicate a receiving status of the N CBGs (where N can be an integer greater than 2). According to the used indication manner, in a payload of different responses sent for a same TB, a bit in a same location indicates a receiving status of a CBG in a same location. A quantity of bits of a payload in a response affects both indication precision of the response and transmission resources of the response.

It can be learned from the foregoing descriptions that, in a communications system using the CBG-based data transmission technology, a single response indication manner has poor flexibility, and therefore the communications system cannot achieve a balance between improving indication precision of a response and reducing transmission resources of the response.

SUMMARY

This application provides a communication method and a communications device, to improve flexibility of a response indication manner.

According to a first aspect, an embodiment of this application provides a communication method. The method may be applied to a communications system that includes a terminal device and a network device. A first device is the terminal device or the network device that receives target data. A second device is the terminal device or the network device that sends the target data. In the method, indication manners of two responses (a first response and a second response) that are separately sent by the first device to the second device and that are used to indicate a transmission result of the target data are different.

According to the method, because indications of the two responses that are sent by the first device at different times and that are used to indicate transmission of the same target data may be different, this solution can improve flexibility of a response indication manner. Therefore, the communications system can flexibly adjust indication manners of responses sent at different times to ensure indication precision of the responses while reducing transmission resources of the responses.

In a possible implementation, before the first device sends the first response to the second device, the first device receives first data from the second device, where the first data is data in $X^{th}$ transmission of the target data, the first data includes some or all of the target data, the first response is used to indicate a transmission result of the target data after the $X^{th}$ transmission, and X is an integer greater than or equal to 1; and the first device generates the first response based on the transmission result of the target data after the $X^{th}$ transmission. Similarly, before the first device sends the second response to the second device, the first device receives second data from the second device, where the second data is data in $Y^{th}$ transmission of the target data, the second data includes some or all of the target data, the second response is used to indicate a transmission result of the target data after the $Y^{th}$ transmission, and Y is an integer greater than X; and the first device generates the first response based on the transmission result of the target data after the $X^{th}$ transmission.

According to the foregoing implementation, after each transmission of the target data, the first device may generate a corresponding response based on a transmission result of the target data after the transmission.

In a possible implementation, the response indication manner may include but is not limited to at least one of the following: a total data range indicated by the response, a quantity of indication bits included in the response, a quantity of first indication bits included in the indication bits of the response, a quantity of data blocks indicated by each first indication bit, a location of each data block indicated by each indication bit (including a first indication bit), whether locations of at least two data blocks indicated by each first indication bit are consecutive, or a logical operation method used for generating each first indication bit.

According to the foregoing implementation, the communications system may adjust the response indication manner from a plurality of perspectives, further improving flexibility of the response indication manner.

In a possible implementation, each response is used to indicate a transmission result of all of the target data, or indicate a transmission result of data transmitted each time. For example, when the second data includes some of the target data, the second response is used to indicate a transmission result of this part of data after the Y transmission.

According to the foregoing implementation, flexibility of a response in the communications system can be improved.

In a possible implementation, the first response includes $P_X$ indication bits, the $P_X$ indication bits are used to indicate a transmission result of the target data, the second response includes $P_Y$ indication bits, the $P_Y$ indication bits are used to indicate a transmission result of the target data, and both $P_X$ and $P_Y$ are positive integers. In this case, that an indication manner of the first response is different from an indication manner of the second response includes at least the following several cases:

first case: $P_X$ and $P_Y$ are unequal; and second case: $P_X$ and $P_Y$ are equal, and a k bit in the $P_X$ indication bits and a $k^{th}$ bit in the $P_Y$ indication bits indicate transmission results of different parts of the target data, where k is a positive integer less than or equal to $P_X$.

In a possible implementation, when the communications system transmits uplink data and downlink data by using a data-block-based data transmission technology, the target data includes N data blocks, where N is a positive integer. When each response is used to indicate all of the target data, the $P_X$ indication bits are used to indicate a transmission result of the N data blocks, where $P_X$ is less than or equal to N; and the $P_Y$ indication bits are used to indicate a transmission result of the N data blocks, where $P_Y$ is less than or equal to N.

In a possible implementation, the $P_i$ indication bits include $Q_i$ first indication bits, any first indication bit is used to indicate a transmission result of at least two of the N data blocks, i is equal to X or Y, and $Q_i$ is a positive integer less than or equal to $P_i$.

In a possible implementation, each first indication bit in any response indicates at least two data blocks in consecutive locations; or each first indication bit in a response indicates at least two data blocks in nonconsecutive locations; or each of some indication bits in a response indicates at least two data blocks in consecutive locations, and each of another part of first indication bits indicates at least two data blocks in nonconsecutive locations.

According to this implementation, indication flexibility of a first indication bit in a response can be improved.

In a possible implementation, each of the $Q_i$ first indication bits indicates a same quantity of data blocks; or a quantity of data blocks indicated by at least one of the $Q_i$ first indication bits is different from a quantity of data blocks indicated by another first indication bit.

According to this implementation, indication flexibility of a first indication bit in a response can be improved.

In a possible implementation, when N is an integer multiple of $K_i$, each of the $Q_i$ first indication bits is used to indicate a transmission result of $K_i$ CBGs, $Q_i=N/K_i$, and $K_i$ is an integer greater than or equal to 2. For example, when N=9 and $K_i=3$, a corresponding response includes three first indication bits, and each first indication bit indicates a transmission result of three data blocks.

In a possible implementation, the $P_i$ indication bits include $P_i-1$ first indication bits and an indication bit used to indicate a transmission result of $L_i$ data blocks, each of the $P_i-1$ first indication bits is used to indicate a transmission result of $K_i$ data blocks, $P_i=[N/K_i]$, $K_i$ is an integer greater than or equal to 2, and $L_i=N-K_i\times(P_i-1)$. When $L_i=1$, $P_i-1=Q_i$; or when $L_i>1$, the indication bit indicating the transmission result of the $L_i$ data blocks is also a first indication bit, that is, $P_i=Q_i$.

In a possible implementation, $K_i$ may be obtained from a response indication manner sent after $i^{th}$ transmission.

In a possible implementation, $Q_i=Q_{i0}+Q_{i1}$, where each of the $Q_{i0}$ first indication bits is used to indicate a transmission result of $K_{i0}$ data blocks, each of the $Q_{i1}$ first indication bits is used to indicate a transmission result of $K_{i1}$ data blocks, both $Q_{i0}$ and $Q_{i1}$ are positive integers, $K_{i0}$ and $K_{i1}$ are integers greater than or equal to 2, and $K_{i0}$ and $K_{i1}$ are unequal.

In a possible implementation, when X=1, the first data includes the N data blocks, $P_X$ is equal to N, and each of the $P_X$ indication bits indicates a transmission result of one of the N data blocks. $P_Y$ is less than N, and the $P_Y$ indication bits include at least one first indication bit.

According to this implementation, indication precision of a response after initial transmission of target data can be improved.

In a possible implementation, a response indication manner may be specifically set based on different transmission times of the target data. For example, a response indication manner is set for first transmission of the target data, and a response indication manner is set for retransmission of the target data; or a corresponding response indication manner is set for each transmission of the target data.

According to this implementation, flexibility of a response indication manner in the communications system can be improved.

In a possible implementation, an indication manner of any response is agreed on by the first device and the second device, or is sent by the second device to the first device.

This implementation can ensure that a response indication manner used by the first device to generate a response after each transmission of the target data is consistent with a response indication manner used by the second device to parse the response, thereby ensuring transmission reliability and efficiency of the target data.

In a possible implementation, when the second device is the network device, and the first device is the terminal device, the second device may add an indication manner of any response to any of the following information and send the information to the first device:

DCI, a media access control (MAC) control element (CE), radio resource control (RRC) signaling, and a system message, where the system message may include a master information block (MIB) and a system information block (SIB).

In a possible implementation, when the second device is transmitting data blocks of the target data, if determining that some or all of the data blocks may fail to be transmitted in the current transmission due to some special factors (for example, transmission resources are pre-empted), the second device notifies the first device by using indication information. In this way, the first device may determine, based on the indication information, data blocks whose transmission is to fail. This prevents the first device from performing processing operations, such as decoding and storage (for soft combination or check), on the data blocks whose transmission is to fail, thereby saving resources of the first device. After receiving the indication information, the first device deletes the stored data blocks that are determined based on the indication information. Therefore, when the data blocks are retransmitted next time, because the previously transmitted data blocks are not stored, the first device cannot perform soft combination or check on the data blocks. This is equivalent to that the data blocks are transmitted for the first time. To ensure precision of indicating the data blocks by a response generated after the next-time retransmission, optionally, the response includes second indication bits whose quantity is the same as that of the data blocks, and each second indication bit is used to indicate a transmission result of one of the data blocks.

For example, the first data includes $M_X$ data blocks of the N data blocks, and $M_X$ is a positive integer less than or equal to N;

before or when sending third data, the second device sends indication information to the first device if determining that data blocks of the third data may fail to be transmitted, where the third data is data in $(X-1)^{th}$ transmission of the target data, and the third data includes some or all data blocks of the target data;

the first device receives the indication information from the second device, and determines $M_{X0}$ data blocks from the $M_X$ data blocks based on the indication information, where $M_{X0}$ is an integer greater than or equal to 0 and less than or equal to $M_X$; and the $P_X$ indication bits included in the first response include at least $M_{X0}$ second indication bits, and each of the $M_{X0}$ second indication bits is used to indicate a transmission result of one of the $M_{X0}$ data blocks.

According to this implementation, during specific transmission of the target data, if some data blocks of the target data fail to be transmitted due to a special cause (for example, transmission resources are pre-empted), precision of indicating the data blocks by a response generated after next-time retransmission can be ensured.

In a possible implementation, when the communications system supports pre-emption (pre-emption), the indication information is discontinuous transmission indication information. The discontinuous transmission indication is used to indicate a transmission resource. After receiving the indication information, the first device determines that the transmission resource indicated by the discontinuous transmission indication partially overlaps a transmission resource occupied by the second device in the $(X-1)^{th}$ transmission of the target data, and may determine that transmission of data blocks to be received on the transmission resource indicated by the discontinuous transmission indication fails after the $(X-1)^{th}$ transmission. A response sent by the first device to the second device after the $(X-1)^{th}$ transmission indicates that the transmission of the data blocks fails. Therefore, the first device may determine the retransmitted data blocks (namely, the $M_{X0}$ data blocks) from the first data (namely, the $M_X$ data blocks) in the $X^{th}$ transmission, and therefore may determine a transmission result of the $M_{X0}$ data blocks and further generate the second response including the $M_{X0}$ second indication bits.

In a possible implementation, when the communications system sets a corresponding response indication manner for each transmission of the target data, after receiving the indication information from the second device, the first device may generate the first response according to the following methods:

First method: The first device no longer generates the first response in a response indication manner that is set for the $X^{th}$ transmission, but generates the first response including N indication bits. Each of the N indication bits indicates a transmission result of one of the N data blocks. The N indication bits include the $M_{X0}$ second indication bits.

Second method: The first device still generates the first response in the response indication manner that is set for the $X^{th}$ transmission, that is, a transmission result of data blocks other than the $M_{X0}$ data blocks in the N data blocks is still indicated in the response indication manner that is set for the $X^{th}$ transmission.

In a possible implementation, when the first device generates the first response by using the first method in the foregoing implementation, the first device may generate a response after $(X+1)^{th}$ transmission in the response indication manner that is set for the $X^{th}$ transmission, or skipping the response indication manner that is set for the $X^{th}$ transmission but directly using a response indication manner that is set for the $(X+1)^{th}$ transmission.

Optionally, in the communications system, the first device and the second device also need to agree on the following content, or the network device or the second device configures the following content after transmission resources are pre-empted in the $(X-1)^{th}$ transmission: a method for generating a response to be sent after the $X^{th}$ transmission, and a response indication manner used to subsequently generate a response after $(X+j)^{th}$ transmission, where j is an integer greater than 0.

According to a second aspect, an embodiment of this application provides a communication method. The method may be applied to a communications system that includes a terminal device and a network device. A first device is a receiving device of target data in the terminal device and the network device. A second device is a sending device of the target data in the terminal device and the network device. In the method, indication manners of two responses (a first response and a second response) that are separately received by the second device from the first device and that are used to indicate a transmission result of the target data are different.

According to the method, because indications of the two responses that are sent by the first device at different times and that are used to indicate transmission of the same target data may be different, this solution can improve flexibility of a response indication manner. Therefore, the communications system can flexibly adjust indication manners of responses sent at different times to ensure indication precision of the responses while reducing transmission resources of the responses.

In a possible implementation, before the second device receives the first response from the first device, the second device sends first data to the first device, where the first data is data in $X^{th}$ transmission of the target data, the first data includes some or all of the target data, the first response is used to indicate a transmission result of the target data after the $X^{th}$ transmission, and X is an integer greater than or equal to 1; and before the second device receives the second response from the first device, the second device sends second data to the first device, where the second data is data in $Y^{th}$ transmission of the target data, the second data includes some or all of the target data, the second response is used to indicate a transmission result of the target data after the $Y^{th}$ transmission, and Y is an integer greater than X.

According to this implementation, the first device may generate the first response and the second response based on the received transmission results of the target data after the $X^{th}$ transmission and the $Y^{th}$ transmission.

In a possible implementation, when the second device is transmitting data blocks of the target data, if determining that some or all of the data blocks may fail to be transmitted in the current transmission due to some special factors (for example, transmission resources are pre-empted), the second device notifies the first device by using indication information. In this way, the first device may determine, based on the indication information, data blocks whose transmission is to fail. This prevents the first device from performing processing operations, such as decoding and storage (for soft combination or check), on the data blocks whose transmission is to fail, thereby saving resources of the first device. After receiving the indication information, the first device deletes the stored data blocks that are determined based on the indication information. Therefore, when the data blocks are retransmitted next time, because the previously transmitted data blocks are not stored, the first device cannot perform soft combination or check on the data blocks. This is equivalent to that the data blocks are transmitted for the first time. To ensure precision of indicating the data blocks by a response generated after the next-time retransmission, optionally, the response includes second indication bits whose quantity is the same as that of the data blocks, and each second indication bit is used to indicate a transmission result of one of the data blocks.

According to a third aspect, this application provides a first device, including units or modules configured to perform the steps in the first aspect.

According to a fourth aspect, this application provides a second device, including units or modules configured to perform the steps in the second aspect.

According to a fifth aspect, this application provides a first device, including a transceiver, a processor, and a memory. The processor is configured to invoke and execute a computer program stored in the memory, and implement the method provided in the first aspect by sending and receiving data by using the transceiver.

According to a sixth aspect, this application provides a second device, including a transceiver, a processor, and a memory. The processor is configured to invoke and execute a computer program stored in the memory, and implement the method provided in the second aspect by sending and receiving data by using the transceiver.

According to a seventh aspect, this application provides a communications device, including at least one processing element (or chip) configured to perform the method in the first aspect or the second aspect.

According to an eighth aspect, this application provides a program. When being executed by a processor, the program is used to perform the method in any one of the foregoing aspects.

According to a ninth aspect, this application provides a program product, for example, a computer readable storage medium, including the program in the eighth aspect.

According to a tenth aspect, this application provides a chip. The chip is configured to read and execute a computer program stored in a memory, to implement the method in any one of the foregoing aspects.

According to an eleventh aspect, an embodiment of this application provides a chip system. The chip system includes a processor, configured to support either a first device or a second device in implementing a function described in the foregoing corresponding aspects. In a possible implementation, the chip system further includes a memory. The memory is configured to store a program instruction and data that are required for the device. The chip system may include a chip, or may include a chip and another discrete device.

According to a twelfth aspect, an embodiment of this application provides a communications system. The communications system includes a first device configured to implement the first aspect, and a second device configured to implement the second aspect.

In the solution provided in the embodiments of this application, the first device in the communications system separately sends, to the second device, the responses used to indicate the transmission result of the target data: the first response and the second response, where the indication manner of the first response is different from the indication manner of the second response. In this solution, because indications of the two responses that are sent by the first device at different times and that are used to indicate transmission of the same target data may be different, this solution can improve flexibility of a response indication manner. Therefore, the communications system can flexibly adjust indication manners of responses sent at different times to ensure indication precision of the responses while reducing transmission resources of the responses.

DESCRIPTION OF EMBODIMENTS

Figure 1:
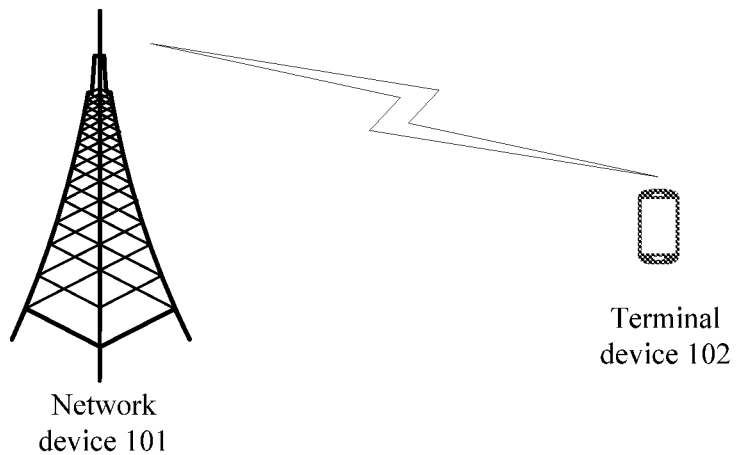
FIG. 1 is a schematic architectural diagram of a communications system according to an embodiment of this application.

This application provides a communication method and a communications device, to improve flexibility of a response indication manner. The method and the device are based on a same invention idea. Because a principle of resolving problems according to the method and the device is similar, mutual reference may be made to implementations of the device and the method, and repeated content is not described in detail.

In a solution provided in an embodiment of this application, a first device in a communications system separately sends, to a second device, responses used to indicate a transmission result of target data: a first response and a second response, where an indication manner of the first response is different from an indication manner of the second response. In this solution, because indications of the two responses that are sent by the first device at different times and that are used to indicate transmission of the same target data may be different, this solution can improve flexibility of a response indication manner. Therefore, the communications system can flexibly adjust indication manners of responses sent at different times to ensure indication precision of the responses while reducing transmission resources of the responses.

In the following, some terms in this application are described, to help persons skilled in the art have a better understanding.

(1) A network device is a device, in a network, that connects a terminal device to a wireless network. The network device is a node in a wireless access network, and may also be referred to as a base station, or may be referred to as a radio access network (RAN) node (or device). Currently, some examples of the network device are as follows: a gNB, a transmission reception point (TRP), an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), a wireless fidelity (Wi-Fi) access point (AP), and the like. In addition, in a network structure, the network device may include a unified unit (CU) node and a distributed unit (distributed unit, DU) node. In this structure, an eNB protocol layer in a long term evolution (LTE) system is split. Some functions of the protocol layer are controlled by the CU in a centralized manner, and all or some of remaining functions of the protocol layer are distributed on the DU. The CU controls the DU in a centralized manner.

(2) A terminal device is also referred to as user equipment (UE), a mobile station (MS), a mobile terminal (MT), or the like, and is a device that provides voice and/or data connectivity for a user, for example, a handheld device or an in-vehicle device with a wireless connection function. Currently, some examples of the terminal device are as follows: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

(3) A first device is a receiving device of target data in a communications system. In subsequent descriptions, a first device is used to replace a receiving device of target data. When the target data is downlink data, the first device is a terminal device; or when the target data is uplink data, the first device is a network device. The communications system supports data transmission based on a HARQ technology. Therefore, after each transmission of the target data, the first device needs to send a response for the target data to a second device, to notify the second device of a transmission result of the target data after the current transmission.

(4) A second device is a sending device of target data in a communications system. In subsequent descriptions, a second device is used to replace a sending device of target data. When the target data is downlink data, the second device is a network device; or when the target data is uplink data, the second device is a terminal device. The communications system supports data transmission based on a HARQ technology. Therefore, each time the second device receives a response for the target data from the second device, the second device retransmits, based on a transmission result of the target data that is indicated by the response, data that is in the target data and that fails to be transmitted.

(5) A response is used to notify a second device of a transmission result of target data. The transmission result indicates whether a first device successfully receives the target data.

The response indicates the transmission result of the target data by using at least one indication bit of a payload.

For example, when an indication bit of the response is an ACK (for example, 1), it indicates that a transmission result, indicated by the indication bit, of data in the target data is transmission succeeded; or when an indication bit of the response is a NACK (for example, 0), it indicates that a transmission result, indicated by the indication bit, of the data is transmission failed.

In a communications system that supports a HARQ technology, in a HARQ process, a first device generates a response for the target data depending on whether the target data is successfully received, and sends the response to a second device, to notify the second device of a transmission result of the target data, so that the second device may determine, based on the response, whether the target data needs to be retransmitted and which data in the target data is to be retransmitted. This can ensure reliability of data transmission in the communications system.

(5) A size of target data is a basic unit of data transmission between a network device and a terminal device in a communications system, that is, data transmitted in a HARQ process. Optionally, the target data may be a TB.

In addition, the target data may be divided into at least one part. For example, the target data may be divided into N data blocks (for example, CBGs or code blocks (CB)), where N is a positive integer. In this way, some of the target data may be retransmitted in a HARQ process of the target data. This ensures transmission reliability of the target data while reducing retransmission overheads of a second device, thereby saving transmission resources.

(5) In a scenario in which target data is divided into N data blocks, a first indication bit is used to indicate a transmission result of at least two of the N data blocks. A value of the first indication bit is generated by performing a logical operation on a result of transmitting each of the at least two data blocks by a first device. Therefore, the first indication bit may indicate a transmission result of all of the at least two data blocks.

Optionally, the logical operation may include at least one of the following: AND, OR, NOT, XNOR, or XOR.

For example, when a terminal device determines that all transmission results, indicated by a first indication bit, of three of N data blocks are ACKs, the terminal device performs an AND operation on the transmission results of the three data blocks, and determines that a value of the first indication bit is ACK&ACK&ACK=ACK. When the terminal device sends a response including the first indication bit to a network device, the network device may determine, based on the value of the first indication bit, that the three data blocks are transmitted successfully, and the three data blocks do not need to be retransmitted.

For another example, when the terminal device determines that transmission results, indicated by a first indication bit, of four of the N data blocks include ACKs for three data blocks and a NACK for one data block, the terminal device performs an AND operation on the transmission results of the four data blocks, and determines that a value of the first indication bit is ACK&ACK&ACK&NACK=NACK. When the terminal device sends a response including the first indication bit to the network device, the network device may determine, based on the value of the first indication bit, that the four data blocks include a data block that fails to be transmitted. Therefore, the network device may occupy a scheduled resource in a HARQ process to retransmit the four data blocks.

In addition, it needs to be further noted that each indication bit other than a first indication bit in a response is used to indicate a transmission result of one data block.

(6) A response indication manner is a manner of indicating a transmission result of target data by a response. Optionally, the response indication manner may include but is not limited to at least one of the following: a total data range indicated by the response, a quantity of indication bits included in the response, a quantity of first indication bits included in the indication bits of the response, a quantity of data blocks indicated by each first indication bit, a location of each data block indicated by each indication bit (including a first indication bit), whether locations of at least two data blocks indicated by each first indication bit are consecutive, or a logical operation method used for generating each first indication bit.

To sum up, the response indication manner may be used by a first device to generate the response; and may also be used by a second device to parse the response, to determine which data blocks are specifically indicated by each indication bit in the response, and determine a transmission result of the data blocks that is indicated by each indication bit.

To ensure transmission reliability of target data and save transmission resources, a response indication manner used by the first device to generate a response needs to be consistent with a response indication manner used by the second device to parse the response. Therefore, in the embodiments of this application, an indication manner used for generating and parsing a response after each transmission of target data is agreed on by the first device and the second device, or is sent by the second device to the first device.

(7) Indication information is sent by a second device and is used by a first device to determine a data block that fails to be transmitted. The indication information may include information related to the determined data block that fails to be transmitted, for example, location information, at a target moment, of the data block that fails to be transmitted, or a resource occupied by the data block that fails to be transmitted. In this way, after receiving the indication information, the first device may determine, based on the indication information, the data block that fails to be transmitted.

Optionally, the indication information may be discontinuous transmission indication information.

The discontinuous transmission indication is used to indicate a transmission resource. The transmission resource indicated by the discontinuous transmission indication partially overlaps a transmission resource occupied by the second device in current transmission of target data. After receiving the indication information, the first device may determine that transmission of a data block to be received on the transmission resource indicated by the discontinuous transmission indication fails.

Optionally, the transmission resource indicated by the discontinuous transmission indication may be used to transmit other service data, for example, used for an ultra reliable low latency communication (URLLC) service.

Optionally, when the second device is a network device, the network device may send, to a terminal device, downlink control information (DCI) carrying the discontinuous transmission indication.

(8) The term "and/or" describes an association relationship for describing associated objects and represents that three relationships may exist. For example, A and/or B may represent the following three cases: Only A exists, both A and B exist, and only B exists.

In addition, it should be understood that, in the descriptions of this application, terms such as "first" and "second" are merely intended for a purpose of differentiated description, and shall not be understood as an indication or an implication of relative importance, or an indication or an implication of a sequence.

The following describes the embodiments of this application in detail with reference to the accompanying drawings.

FIG. 1 shows a communications system to which a communication method provided in an embodiment of this application is applicable. As shown in FIG. 1, the communications system includes a network device 101 and a terminal device 102.

The network device 101 is responsible for providing a service related to wireless access for the terminal device 102, to implement a wireless physical-layer function, resource scheduling and wireless resource management, qualify of service (QoS) management, wireless access control, and a mobility management function.

The terminal device 102 is a device that connects to a network through the network device 101.

The network device 101 and the terminal device 102 are connected through a Uu interface, to implement communication between the terminal device 102 and the network device 101.

Optionally, the communications system may transmit uplink data and downlink data by using a data-block-based data transmission technology.

In a process of transmitting data by a first device to a second device, the first device divides target data to be transmitted in a HARQ process into N data blocks (for example, CBGs). The first device is any one of the network device 101 and the terminal device 102. The second device is the other device, different from the first device, in the network device 101 and the terminal device 102. Optionally, the quantity N of the data blocks into which the target data is divided may be configured by the network device 101.

During first transmission (e.g., initial transmission) of the target data, the first device sends first data including the N data blocks to the second device.

After receiving the first data, the second device sends, based on a transmission result of the N data blocks after the first transmission, a first response for the target data to the first device.

The first device determines, based on the received first response, a data block that fails to be transmitted, and then sends second data including the data block to the second device during second transmission (e.g., first retransmission) of the target data.

After receiving the second data, the second device sends, based on a transmission result of the N data blocks after the second transmission, a second response for the target data to the first device.

The first device and the second device repeat the foregoing retransmission process, until a response sent by the first device indicates that all of the N data blocks are transmitted successfully after a transmission.

It should be noted that the communications system shown in FIG. 1 is merely an example of a communications system to which the embodiments of this application are applicable, and the embodiments of this application may also be applied to a 5 generation (5G) communications system, a new radio (NR) system, a long term evolution (LTE) system, and another communications system evolved based on the foregoing communications system. This is not limited in the embodiments of this application. In addition, the communications system may support a carrier aggregation technology and a multiple-antenna technology. The communications system may support data transmission based on a slot and/or data transmission based on a mini-slot. This is not limited in this application either.

Currently, there is only one response indication manner in the communications system shown in FIG. 1. In this scenario, the following problems exist:

To improve indication precision of a response, each indication bit in each response includes a relatively small quantity of data blocks. For example, each indication bit indicates one data block. In this case, N indication bits are required in a payload of each response. A response sent after next transmission further needs to include an indication bit for each data block successfully transmitted in previous transmission, but the second device already knows, from a previous response, that the data block is transmitted successfully. Therefore, this indication manner increases transmission resources of the response. In addition, when resources for transmitting a response are limited, transmission of a response with an excessively large payload results in an increase in a bit error rate of the response. For example, a value of an indication bit indicating transmission success changes; as a result, the indication bit indicates transmission failure. Therefore, the transmission of the response with an excessively large payload may result in an increase in the number of retransmission times, thereby causing relatively large data transmission overheads.

To reduce transmission resources of a response, each response includes a relatively small quantity of indication bits, and correspondingly, each indication bit in the response indicates a relatively large quantity of data blocks. For example, the response includes a first indication bit that indicates four data blocks. In this case, at least N/4 first indication bits are required in a payload of each response. In this case, compared with the foregoing indication manner, the indication manner in this example can reduce a payload of a response by approximately four times. However, it can be learned from the foregoing description of the first indication bit that, when one of four data blocks indicated by a first indication bit fails to be transmitted, the second device needs to retransmit the four data blocks, wasting transmission resources.

Figure 2:
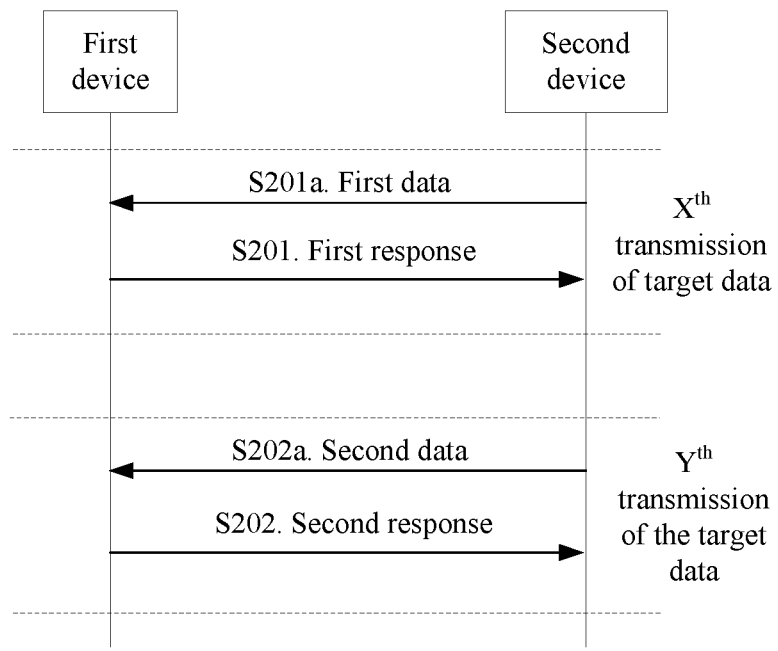
FIG. 2 is a flowchart of a communication method according to an embodiment of this application.

To ensure that a communications system can ensure indication precision of a response without increasing transmission resources of the response, an embodiment of this application provides a communication method. The method may be applied to the communications system shown in FIG. 1. As shown in FIG. 2, a process of the method includes the following steps.

S201a. A second device sends first data to a first device, and correspondingly, the first device receives the first data from the second device. The first data is data in $X^{th}$ transmission of target data, the first data includes some or all of the target data, and X is an integer greater than or equal to 1.

When X=1, the first data is data in initial transmission of the target data, and the first data includes all of the target data; or when X is greater than 2, the first data is data in retransmission of the target data, and the first data includes some or all of the target data.

S201. The first device sends a first response to the second device, and correspondingly, the second device receives the first response from the first device. The first response is used to indicate a transmission result of the target data after the $X^{th}$ transmission.

After receiving the first response from the first device, the second device may determine data that fails to be transmitted and that is indicated by the first response, and then retransmits the data that fails to be transmitted.

It should be noted that, in this embodiment of this application, the second device may retransmit data in the following manners:

First manner: The second device resends the data. In this case, the first device may ignore data that previously fails to be decoded, but decodes only the currently transmitted data. Alternatively, the first device may perform soft combination (chase combining) on the currently transmitted data and the data that previously fails to be decoded, to improve a probability of successfully decoding the data.

Second manner: The second device sends check data of the data, for example, an incremental redundancy (increasing redundancy). In this case, after receiving the check data, the first device checks, by using the check data, data that previously fails to be decoded, to improve a probability of successfully decoding the data.

S202a. The second device sends second data to the first device, and correspondingly, the second device receives the second data from the first device. The second data is data in $Y^{th}$ transmission of the target data, the second data includes some or all of the target data, and Y is an integer greater than X.

S202. The first device sends a second response to the second device, and correspondingly, the second device receives the second response from the first device. The second response is used to indicate a transmission result of the target data after the $Y^{th}$ transmission.

Optionally, each response is used to indicate a transmission result of all of the target data, or indicate a transmission result of data transmitted each time. For example, when the second data includes some of the target data, the second response is used to indicate a transmission result of this part of data after the $Y^{th}$ transmission.

It should be noted that, when each response indicates a transmission result only of data transmitted each time, once a bit error occurs during transmission of the response, for example, an indication bit in the response that should indicate transmission failure indicates transmission success due to a change of a value of the indication bit after the transmission, or an indication bit that should indicate transmission success indicates transmission failure due to a change of a value of the indication bit after the transmission, when the second device performs retransmission based on the response, data transmitted successfully is retransmitted, or data that fails to be transmitted is no longer retransmitted. As a result, data transmission efficiency in the communications system is further reduced. Therefore, in this embodiment of this application, an indication manner in which each response indicates the transmission result of all of the target data is preferentially used.

An indication manner of the first response is different from an indication of the second response.

It can be learned from the foregoing descriptions of the response indication manner that, the indication manner of the first response is different from the indication manner of the second response, that is, at least one of the following is different: a total data range indicated by the response, a quantity of indication bits included in the response, a quantity of first indication bits included in the indication bits of the response, a quantity of data blocks indicated by each first indication bit, a location of each data block indicated by each indication bit (including a first indication bit), whether locations of at least two data blocks indicated by each first indication bit are consecutive, or a logical operation method used for generating each first indication bit.

Optionally, in an implementation, the first response includes $P_X$ indication bits, and the second response includes $P_Y$ indication bits. The $P_X$ indication bits are used to indicate a transmission result of the target data. The $P_Y$ indication bits are used to indicate a transmission result of the target data. Both $P_X$ and $P_Y$ are positive integers.

In this implementation, that an indication manner of the first response is different from an indication of the second response includes at least the following several cases:

first case: $P_X$ and $P_Y$ are unequal; and second case: $P_X$ and $P_Y$ are equal, and a k bit in the $P_X$ indication bits and a k bit in the $P_Y$ indication bits indicate transmission results of different parts of the target data, where k is a positive integer less than or equal to $P_X$.

Optionally, in an implementation, the target data includes N data blocks, where N is a positive integer. N may be configured by a network device in the communications system and notified to a terminal device. The data blocks may be CBGs. This is not limited in this embodiment of this application. A subsequent example is described merely by using an example in which a data block is a CBG. In this case, correspondingly, the first data includes $M_X$ data blocks in the N data blocks, where $M_X$ is a positive integer less than or equal to N; and the second data includes $M_Y$ data blocks in the N data blocks, where $M_Y$ is a positive integer less than or equal to N.

In this implementation, when each response indicates a same total data range, that is, indicates all of the target data, the $P_X$ indication bits are used to indicate a transmission result of the N data blocks, where $P_X$ is less than or equal to N; and the $P_Y$ indication bits are used to indicate a transmission result of the N data blocks, where $P_Y$ is less than or equal to N.

Because an indication bit in each response may indicate a transmission result of at least one data block, a quantity of indication bits in each response is less than or equal to N.

Optionally, in this implementation, the $P_i$ indication bits include $Q_i$ first indication bits. Any first indication bit is used to indicate a transmission result of at least two of the N data blocks. i is equal to X or Y. $Q_i$ is a positive integer less than or equal to $P_i$.

Locations of at least two data blocks indicated by any first indication bit are consecutive or nonconsecutive. Optionally, each first indication bit in a response indicates at least two data blocks in consecutive locations; or each first indication bit in a response indicates at least two data blocks in nonconsecutive locations; or each of some indication bits in a response indicates at least two data blocks in consecutive locations, and each of another part of first indication bits indicates at least two data blocks in nonconsecutive locations.

Optionally, each of the $Q_i$ first indication bits indicates a same quantity of data blocks; or a quantity of data blocks indicated by at least one of the $Q_i$ first indication bits is different from a quantity of data blocks indicated by another first indication bit.

Based on the foregoing descriptions, in a implementation, when N is an integer multiple of $K_i$, $P_i=Q_i$, each of the $Q_i$ first indication bits is used to indicate a transmission result of $K_i$ CBGs, $Q_i=N/K_i$, and $K_i$ is an integer greater than or equal to 2.

For example, when N=9 and $K_i=3$, a corresponding response includes three first indication bits, and each first indication bit indicates a transmission result of three data blocks.

In another implementation, when N is not an integer multiple of $K_i$, the $P_i$ indication bits include $P_i-1$ first indication bits and an indication bit used to indicate a transmission result of $L_i$ data blocks, each of the $P_i-1$ first indication bits is used to indicate a transmission result of $K_i$ data blocks, $P_i=\lceil N/K_i \rceil$, $K_i$ is an integer greater than or equal to 2, and $L_i=N-K_i\times(P_i-1)$. When $L_i=1$, $P_i-1=Q_i$; or when $L_i>1$, the indication bit indicating the transmission result of the $L_i$ data blocks is also a first indication bit, that is, $P_i=Q_i$.

For example, when N=8 and $K_i=3$, a corresponding response includes three first indication bits. Two of the first indication bits each may indicate a transmission result of three data blocks. The other one first indication bit may indicate a transmission result of remaining two data blocks.

For another example, when N=7 and $K_i=3$, a corresponding response includes three indication bits. Two of the indication bits are first indication bits, and each first indication bit indicates a transmission result of three data blocks. The other one indication bit may indicate a transmission result of remaining one data block.

In the foregoing two implementations, $K_i$ may be obtained from a response indication manner sent after $i^{th}$ transmission.

In still another implementation, $Q_i=Q_{i0}+Q_1$. Each of the $Q_{i0}$ first indication bits is used to indicate a transmission result of $K_{i0}$ data blocks. Each of the $Q_{i1}$ first indication bits is used to indicate a transmission result of $K_{i1}$ data blocks. Both $Q_{i0}$ and $Q_{i1}$ are positive integers. $K_{i0}$ and $K_{i1}$ are integers greater than or equal to 2, and $K_{i0}$ and $K_{i1}$ are unequal.

For example, when N=10, $P_i=Q_i$, $K_{i0}=2$, and $K_{i1}=3$, a corresponding response includes four first indication bits. Two of the first indication bits each indicate a transmission result of two data blocks. The other two first indication bits each indicate a transmission result of three data blocks.

Compared with initial transmission of the target data, after retransmission of the target data, a probability of transmission failure of each data block greatly decreases (because a data block that fails to be transmitted in the initial transmission is retransmitted, a soft combination technology and a check technology in the retransmission can improve a probability of correct decoding). As a result, a quantity of data blocks of the target data block that fail to be transmitted greatly decreases. Therefore, in a response sent after the retransmission of the target data, it is unnecessary to still use one indication bit to indicate each data block that is transmitted successfully; otherwise, transmission resources of the response are wasted.

Based on the foregoing descriptions, this embodiment of this application provides a solution: To ensure indication precision of a response, during the initial transmission (e.g., first transmission) of the target data, a quantity of indication bits in the response is the same as a quantity of data blocks of the target data, that is, one indication bit indicates a transmission result of one data block. To reduce transmission resources of a response, a response sent after the retransmission of the target data may include less than N indication bits, that is, the response includes at least one first indication bit.

According to this solution, when X=1, the first data includes the N data blocks, $P_X$ is equal to N, and each of the $P_X$ indication bits indicates a transmission result of one of the N data blocks. $P_Y$ is less than N, and the $P_Y$ indication bits include at least one first indication bit.

After each transmission of the target data, the first device generates a response by using a corresponding response indication manner. In a implementation, a response indication manner may be specifically set based on different transmission times of the target data. For example, a response indication manner is set for first transmission of the target data, and a response indication manner is set for retransmission of the target data; or a corresponding response indication manner is set for each transmission of the target data.

It can be learned from the foregoing interpretations and descriptions of the response indication manner that, a response indication manner used by the first device to generate a response after each transmission of the target data needs to be consistent with a response indication manner used by the second device to parse the response. Therefore, an indication manner of any response is agreed on by the first device and the second device, or is sent by the second device to the first device.

Optionally, when the second device is a network device, and the first device is a terminal device, the second device may add an indication manner of any response to any of the following information and send the information to the first device:

DCI, a media access control (MAC) control element (CE), radio resource control (RRC) signaling, and a system message, where the system message may include a master information block (MIB) and a system information block (SIB).

In the communications system, when the second device is transmitting data blocks of the target data, if determining that some or all of the data blocks may fail to be transmitted in the current transmission due to some special factors (for example, transmission resources are pre-empted), the second device notifies the first device by using indication information. In this way, the first device may determine, based on the indication information, data blocks whose transmission is to fail. This prevents the first device from performing processing operations, such as decoding and storage (for soft combination or check), on the data blocks whose transmission is to fail, thereby saving resources of the first device. After receiving the indication information, the first device deletes the stored data blocks that are determined based on the indication information. Therefore, when the data blocks are retransmitted next time, because the previously transmitted data blocks are not stored, the first device cannot perform soft combination or check on the data blocks. This is equivalent to that the data blocks are transmitted for the first time. To ensure precision of indicating the data blocks by a response generated after the next-time retransmission, optionally, the response includes second indication bits whose quantity is the same as that of the data blocks, and each second indication bit is used to indicate a transmission result of one of the data blocks.

Based on the preceding descriptions, in a implementation, before the first device sends the first response to the second device, the method further includes the following steps:

before or when sending third data, the second device sends indication information to the first device if determining that data blocks of the third data may fail to be transmitted, where the third data is data in $(X-1)^{th}$ transmission of the target data, and the third data includes some or all data blocks of the target data; and the first device receives the indication information from the second device, and determines $M_{X0}$ data blocks from the $M_X$ data blocks based on the indication information, where $M_{X0}$ is an integer greater than or equal to 0 and less than or equal to $M_X$; and the $P_X$ indication bits included in the first response include at least $M_{X0}$ second indication bits, and each of the $M_{X0}$ second indication bits is used to indicate a transmission result of one of the $M_{X0}$ data blocks.

Optionally, when the communications system supports pre-emption (pre-emption), the indication information is discontinuous transmission indication information.

The discontinuous transmission indication is used to indicate a transmission resource. After receiving the indication information, the first device determines that the transmission resource indicated by the discontinuous transmission indication partially overlaps a transmission resource occupied by the second device in the $(X-1)^{th}$ transmission of the target data, and may determine that transmission of data blocks to be received on the transmission resource indicated by the discontinuous transmission indication fails after the $(X-1)^{th}$ transmission. A response sent by the first device to the second device after the $(X-1)^{th}$ transmission indicates that the transmission of the data blocks fails. Therefore, the first device may determine the retransmitted data blocks (namely, the $M_{X0}$ data blocks) from the first data (namely, the $M_X$ data blocks) in the $X^{th}$ transmission, and therefore may determine a transmission result of the $M_{X0}$ data blocks and further generate the second response including the $M_{X0}$ second indication bits.

A network device in the communications system pre-allocates a corresponding transmission resource for each transmission of the target device. Therefore, before or when the second device transmits the target data, if data transmission needs to be performed for another service with a transmission priority higher than a transmission priority of a service to which the current target data belongs, or data transmission needs to be performed for a URLLC service, to preferentially ensure data transmission for the service with a higher transmission priority or the URLLC service, the second device may occupy a transmission resource allocated by the network device for the current transmission of the target data. Because the second device transmits no data block of the target data on the transmission resource pre-empted for the another service, a data block received by the first device on the pre-empted transmission resource encounters a decoding error. To prevent the first device from storing the data block received on the pre-empted transmission resource to perform soft combination or check, the second device sends the discontinuous transmission indication information to the first device, to notify the first device of the transmission resource pre-empted for the another service.

Optionally, the second device may directly send the indication information to the second device, or the second device sends the indication information through broadcasting. When the indication information is sent through broadcasting, after receiving the indication information, the first device may determine whether a transmission resource indicated by the indication information partially overlaps a transmission resource allocated by the network device for the current transmission of the target data, so as to determine whether the indication information is sent by the second device for the first device. When the second device determines that the indication information is not sent for the second device, 0 data blocks may be determined based on the indication information.

In addition, it should be further noted that, when the communications system sets a corresponding response indication manner for each transmission of the target data, after receiving the indication information from the second device, the first device may generate the first response according to the following methods:

First method: The first device no longer generates the first response in a response indication manner that is set for the $X^{th}$ transmission, but generates the first response including N indication bits. Each of the N indication bits indicates a transmission result of one of the N data blocks.

Certainly, the N indication bits include the $M_{x0}$ second indication bits.

Second method: The first device still generates the first response in the response indication manner that is set for the $X^{th}$ transmission, that is, a transmission result of data blocks other than the $M_{x0}$ data blocks in the N data blocks is still indicated in the response indication manner that is set for the X transmission.

Optionally, when the first device generates the first response by using the first method, the first device may generate a response after $(X+1)^{th}$ transmission in the response indication manner that is set for the $X^{th}$ transmission, or skipping the response indication manner that is set for the $X^{th}$ transmission but directly using a response indication manner that is set for the $(X+1)^{th}$ transmission.

Optionally, in the communications system, the first device and the second device also need to agree on the following content, or the network device or the second device configures the following content after transmission resources are pre-empted in the $(X-1)^{th}$ transmission: a method for generating a response to be sent after the $X^{th}$ transmission, and a response indication manner used to subsequently generate a response after $(X+j)^{th}$ transmission, where j is an integer greater than 0.

In addition, it should be further noted that, during data transmission in the communications system, the foregoing communication method may be performed for data transmission of a specific service, or the foregoing communication method may be performed for data transmission of some specified data, or the foregoing communication method may be performed for data transmission in an uplink direction or a downlink direction, or the foregoing communication method may be performed for data transmission of all uplink and downlink data of all services. When the communications system further supports a multiple-antenna technology, and multiple pieces of non-interfering target data may be transmitted on a same transmission resource (for example, an LTE system supports simultaneous transmission of two TBs), the foregoing method may also be performed for data transmission of at least one of the multiple pieces of simultaneously transmitted target data. The foregoing solutions are not limited in this application.

This embodiment of this application provides the communication method. The first device in the communications system separately sends, to the second device, the responses used to indicate the transmission result of the target data: the first response and the second response, where the indication manner of the first response is different from the indication manner of the second response. In this solution, because indications of the two responses that are sent by the first device at different times and that are used to indicate transmission of the same target data may be different, this solution can improve flexibility of a response indication manner. Therefore, the communications system can flexibly adjust indication manners of responses sent at different times to ensure indication precision of the responses while reducing transmission resources of the responses.

Based on the foregoing embodiment, an embodiment of this application provides the following examples of a communication method. The following examples are applicable to the communications system shown in FIG. 1. The communications system transmits data by using a data-block-based data transmission technology. For ease of description, the following examples are described by using an example in which a TB transmitted by a second device to a first device includes six CBGs.

Example 1

Figure 3A:
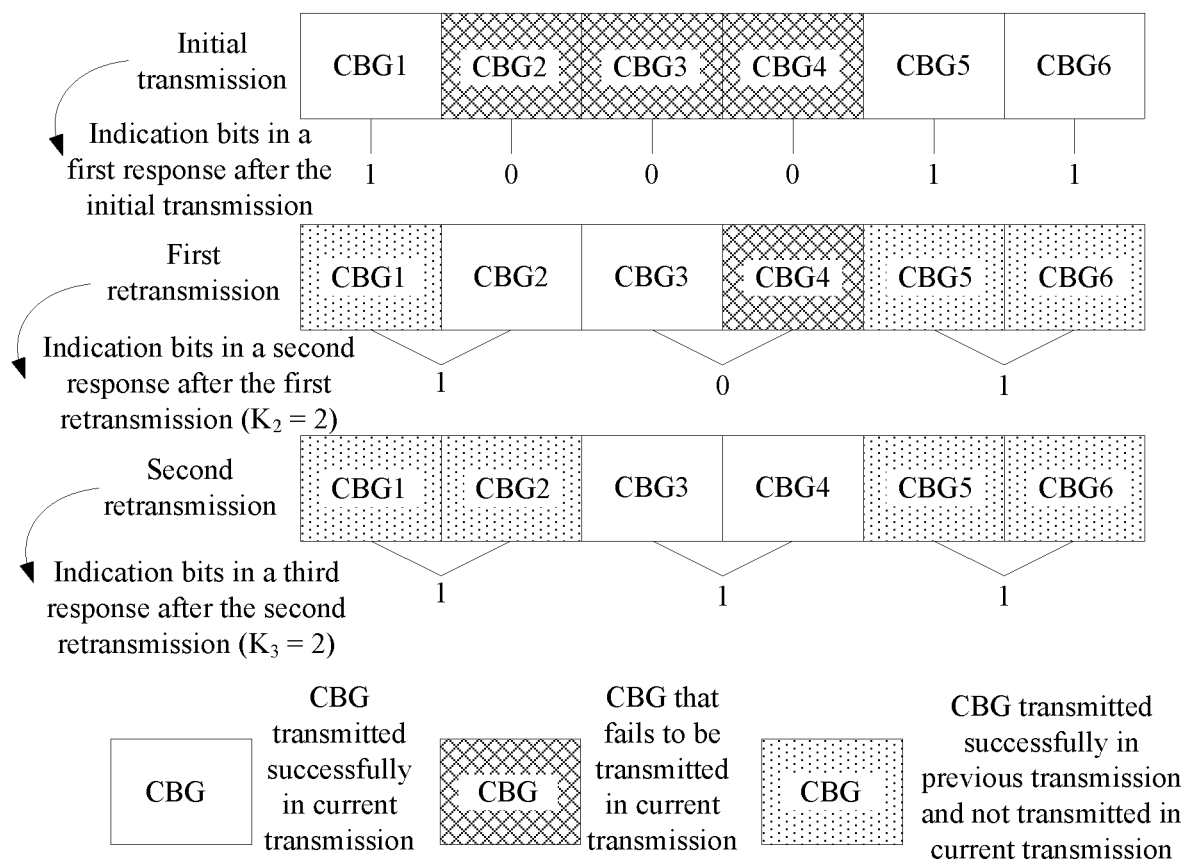
FIG. 3A is a schematic diagram of an example of a first communication method according to an embodiment of this application.

As shown in FIG. 3A, during initial transmission of the TB, the second device sends the six CBGs to the first device, and a CBG2, a CBG3, and a CBG4 in the six CBGs fail to be transmitted. In this case, the first device generates a first response after the initial transmission based on a transmission result of each of the six CBGs after the initial transmission, and sends the first response to the second device. The first response includes six indication bits. Values of the six indication bits are 100011.

After receiving the first response, the second device sends the CBG2, the CBG3, and the CBG4 to the first device based on the first response in first retransmission of the TB, and the CBG4 fails to be transmitted again. In this case, the first device generates a second response for the first retransmission based on a transmission result of the six CBGs after the first retransmission, and sends the second response to the second device. The second response includes three indication bits. Each indication bit indicates a transmission result of two CBGs in consecutive locations. Values of the three indication bits are 101.

After receiving the second response, the second device sends the CBG3 and the CBG4 to the first device based on the second response in second retransmission of the TB, and both the CBG3 and the CBG4 are transmitted successfully. In this case, the first device generates a third response for the second retransmission based on a transmission result of the six CBGs after the second retransmission, and sends the third response to the second device. The third response includes three indication bits. Each indication bit indicates a transmission result of two CBGs in consecutive locations. Values of the three indication bits are 111.

In Example 1, the communications system sets a response indication manner for the initial transmission of the TB, and sets a response indication manner for the retransmission of the TB.

Example 2

Figure 3B:
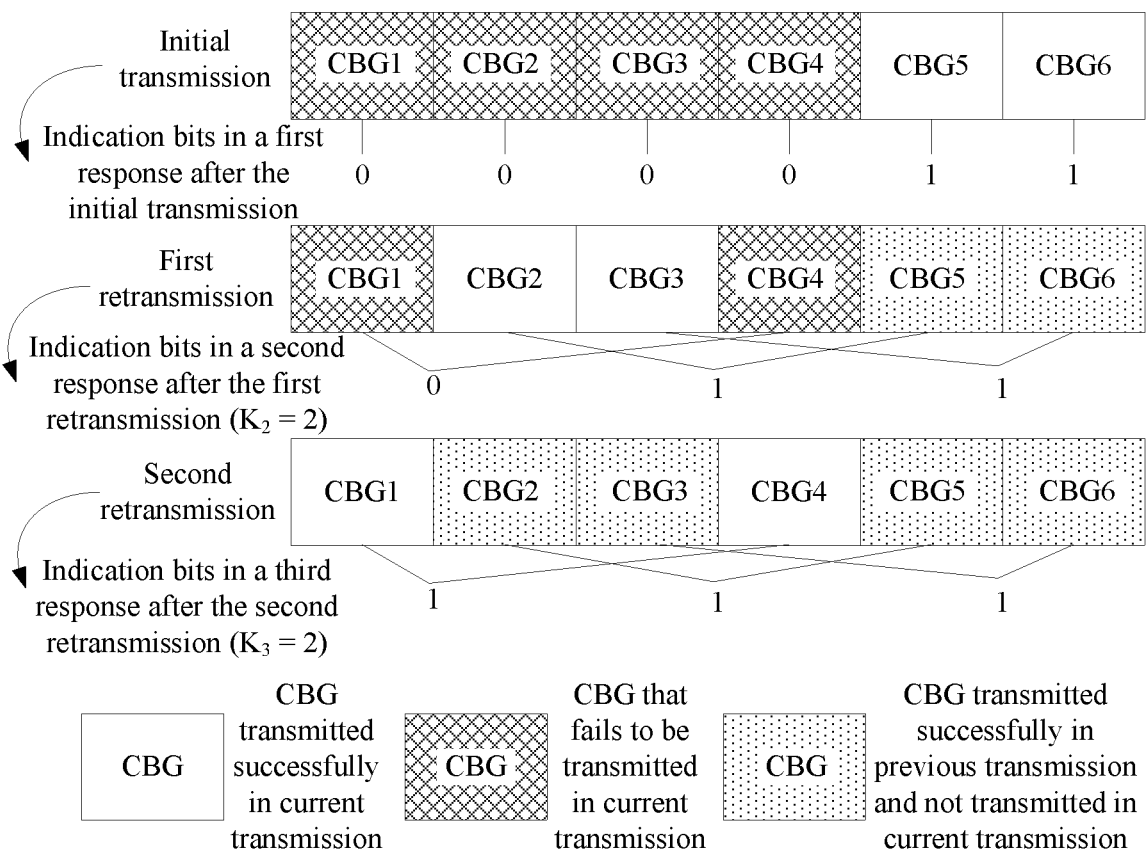
FIG. 3B is a schematic diagram of an example of a second communication method according to an embodiment of this application.

As shown in FIG. 3B, during initial transmission of the TB, the second device sends the six CBGs to the first device, and a CBG1, a CBG2, a CBG3, and a CBG4 in the six CBGs fail to be transmitted. In this case, the first device generates a first response after the initial transmission based on a transmission result of each of the six CBGs after the initial transmission, and sends the first response to the second device. The first response includes six indication bits. Values of the six indication bits are 000011.

After receiving the first response, the second device sends the CBG1, the CBG2, the CBG3, and the CBG4 to the first device based on the first response in first retransmission of the TB, and the CBG1 and the CBG4 fail to be transmitted again. In this case, the first device generates a second response for the first retransmission based on a transmission result of the six CBGs after the first retransmission, and sends the second response to the second device. The second response includes three indication bits. Each indication bit indicates a transmission result of two CBGs in nonconsecutive locations. Values of the three indication bits are 011.

After receiving the second response, the second device sends the CBG1 and the CBG4 to the first device based on the second response in second retransmission of the TB, and both the CBG1 and the CBG4 are transmitted successfully. In this case, the first device generates a third response for the second retransmission based on a transmission result of the six CBGs after the second retransmission, and sends the third response to the second device. The third response includes three indication bits. Each indication bit indicates a transmission result of two CBGs in nonconsecutive locations. Values of the three indication bits are 111.

In Example 2, the communications system sets a response indication manner for the initial transmission of the TB, and sets a response indication manner for the retransmission of the TB.

Example 3

Figure 3C:
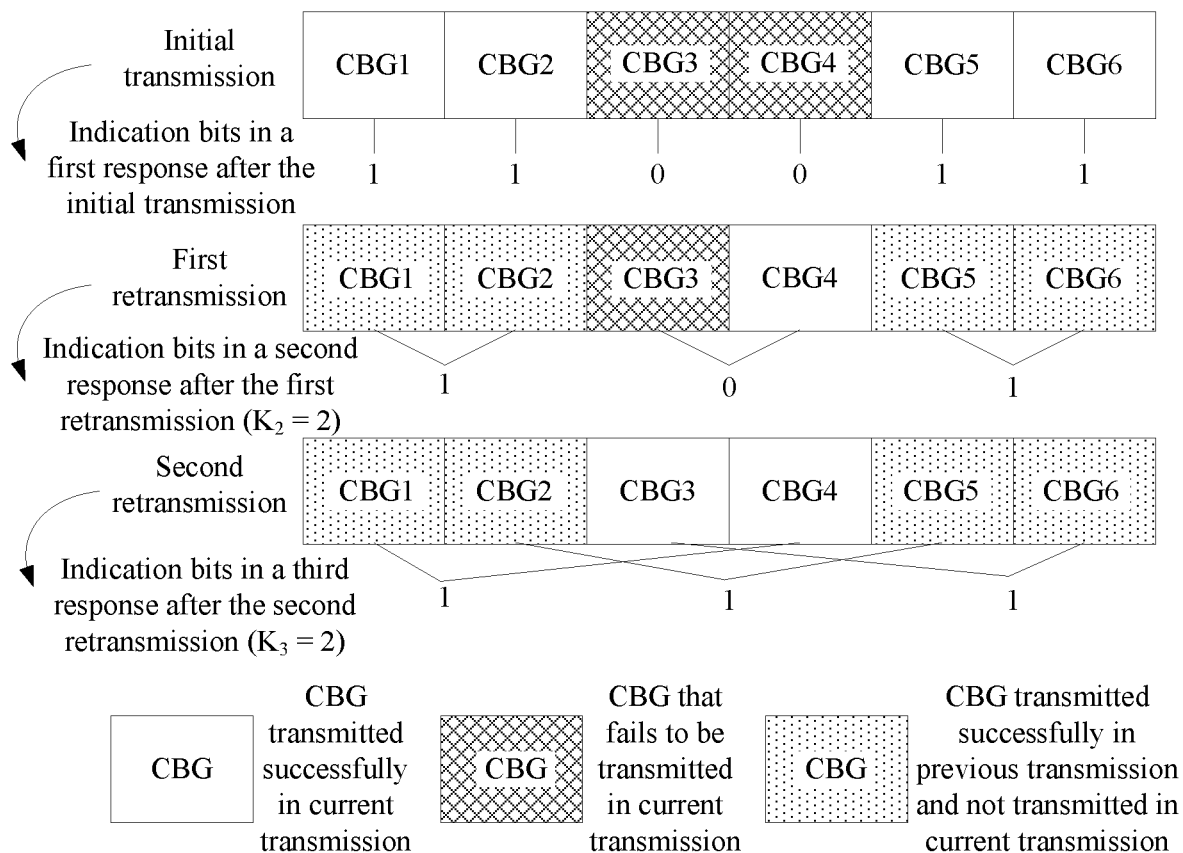
FIG. 3C is a schematic diagram of an example of a third communication method according to an embodiment of this application.

As shown in FIG. 3C, during initial transmission of the TB, the second device sends the six CBGs to the first device, and a CBG3 and a CBG4 in the six CBGs fail to be transmitted. In this case, the first device generates a first response after the initial transmission based on a transmission result of each of the six CBGs after the initial transmission, and sends the first response to the second device. The first response includes six indication bits. Values of the six indication bits are 110011.

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission, and sends the second response to the second device. The second response includes three indication bits. Each indication bit indicates a transmission result of two CBGs in consecutive locations. Values of the three indication bits are 101.

After receiving the second response, the second device sends the CBG3 and the CBG4 to the first device based on the second response in second retransmission of the TB, and both the CBG3 and the CBG4 are transmitted successfully. In this case, the first device generates a third response for the second retransmission based on a transmission result of the six CBGs after the second retransmission, and sends the third response to the second device. The third response includes three indication bits. Each indication bit indicates a transmission result of two CBGs in nonconsecutive locations. Values of the three indication bits are 111.

In Example 3, the communications system sets a corresponding response indication manner for each transmission of the TB.

Example 4

Figure 3D:
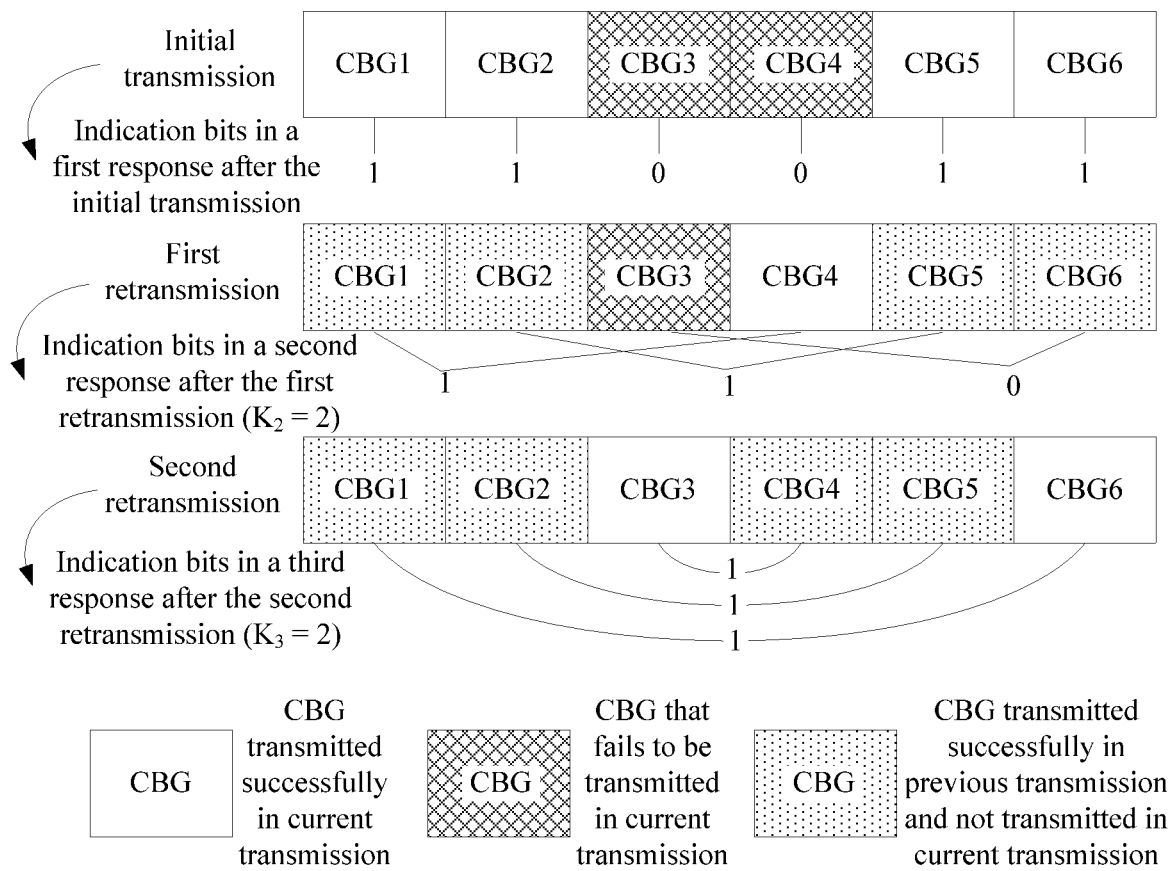
FIG. 3D is a schematic diagram of an example of a fourth communication method according to an embodiment of this application.

As shown in FIG. 3D, during initial transmission of the TB, the second device sends the six CBGs to the first device, and a CBG3 and a CBG4 in the six CBGs fail to be transmitted. In this case, the first device generates a first response after the initial transmission based on a transmission result of each of the six CBGs after the initial transmission, and sends the first response to the second device. The first response includes six indication bits. Values of the six indication bits are 110011.

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission, and sends the second response to the second device. The second response includes three indication bits. Each indication bit indicates a transmission result of two CBGs in nonconsecutive locations. Values of the three indication bits are 110.

After receiving the second response, the second device sends the CBG3 and the CBG4 to the first device based on the second response in second retransmission of the TB, and both the CBG3 and the CBG4 are transmitted successfully. In this case, the first device generates a third response for the second retransmission based on a transmission result of the six CBGs after the second retransmission, and sends the third response to the second device. The third response includes three indication bits. Two of the indication bits each indicate a transmission result of two CBGs in nonconsecutive locations. The other one indication bit indicates a transmission result of two CBGs in consecutive locations. Values of the three indication bits are 111.

In Example 4, the communications system sets a corresponding response indication manner for each transmission of the TB.

Example 5

Figure 3E:
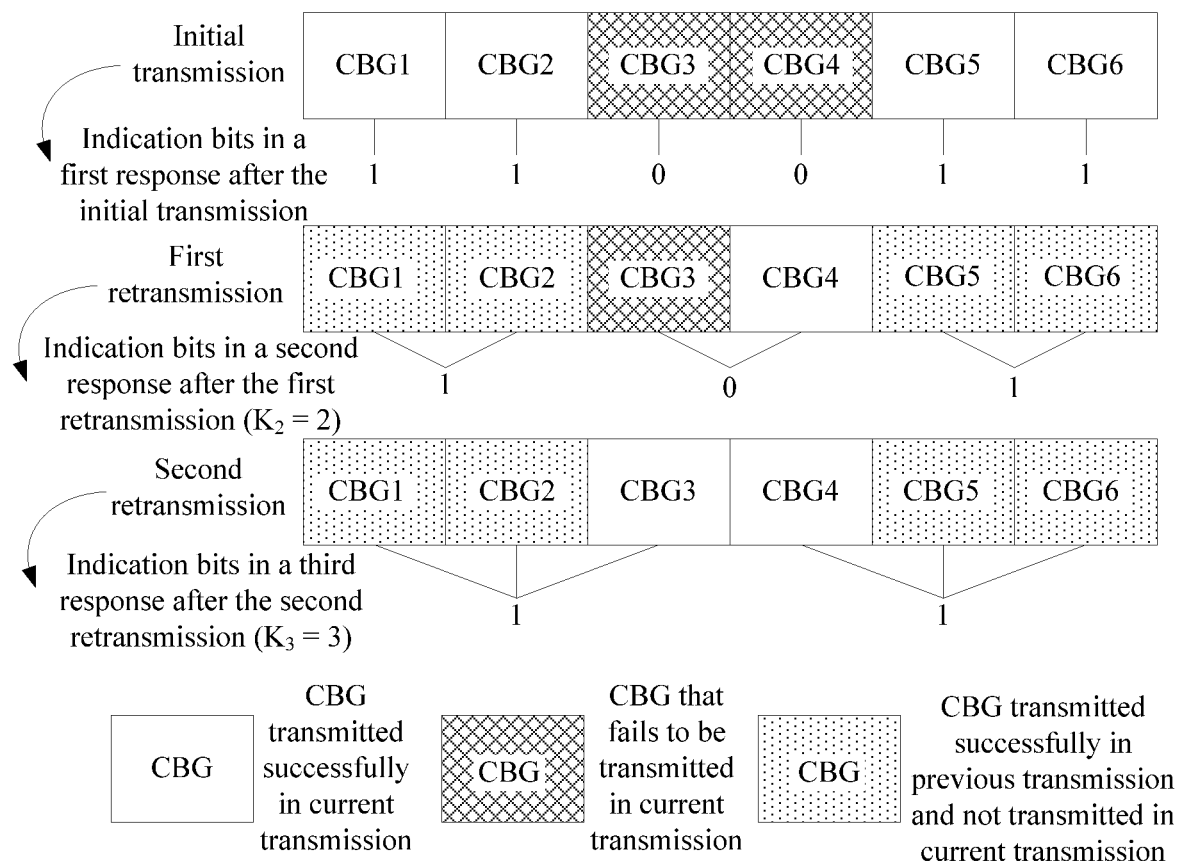
FIG. 3E is a schematic diagram of an example of a fifth communication method according to an embodiment of this application.

As shown in FIG. 3E, during initial transmission of the TB, the second device sends the six CBGs to the first device, and a CBG3 and a CBG4 in the six CBGs fail to be transmitted. In this case, the first device generates a first response after the initial transmission based on a transmission result of each of the six CBGs after the initial transmission, and sends the first response to the second device. The first response includes six indication bits. Values of the six indication bits are 110011.

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission, and sends the second response to the second device. The second response includes three indication bits. Each indication bit indicates a transmission result of two CBGs in consecutive locations. Values of the three indication bits are 101.

After receiving the second response, the second device sends the CBG3 and the CBG4 to the first device based on the second response in second retransmission of the TB, and both the CBG3 and the CBG4 are transmitted successfully. In this case, the first device generates a third response for the second retransmission based on a transmission result of the six CBGs after the second retransmission, and sends the third response to the second device. The third response includes two indication bits. Each indication bit indicates a transmission result of three CBGs in consecutive locations. Values of the two indication bits are 11.

In Example 5, the communications system sets a corresponding response indication manner for each transmission of the TB.

Example 6

Figure 3F:
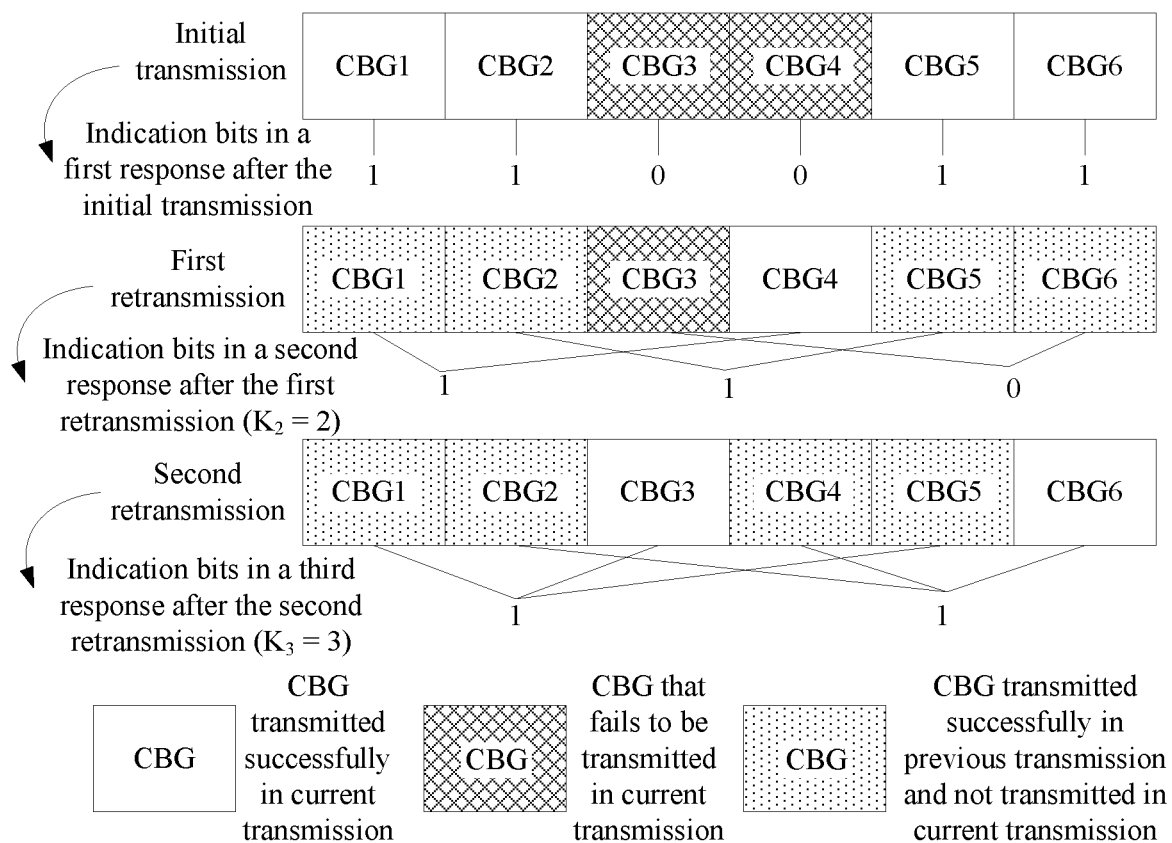
FIG. 3F is a schematic diagram of an example of a sixth communication method according to an embodiment of this application.

As shown in FIG. 3F, during initial transmission of the TB, the second device sends the six CBGs to the first device, and a CBG3 and a CBG4 in the six CBGs fail to be transmitted. In this case, the first device generates a first response after the initial transmission based on a transmission result of each of the six CBGs after the initial transmission, and sends the first response to the second device. The first response includes six indication bits. Values of the six indication bits are 110011.

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission, and sends the second response to the second device. The second response includes three indication bits. Each indication bit indicates a transmission result of two CBGs in nonconsecutive locations. Values of the three indication bits are 110.

After receiving the second response, the second device sends the CBG3 and the CBG4 to the first device based on the second response in second retransmission of the TB, and both the CBG3 and the CBG4 are transmitted successfully. In this case, the first device generates a third response for the second retransmission based on a transmission result of the six CBGs after the second retransmission, and sends the third response to the second device. The third response includes two indication bits. Each indication bit indicates a transmission result of three CBGs in nonconsecutive locations. Values of the two indication bits are 11.

In Example 6, the communications system sets a corresponding response indication manner for each transmission of the TB.

Figure 3G:
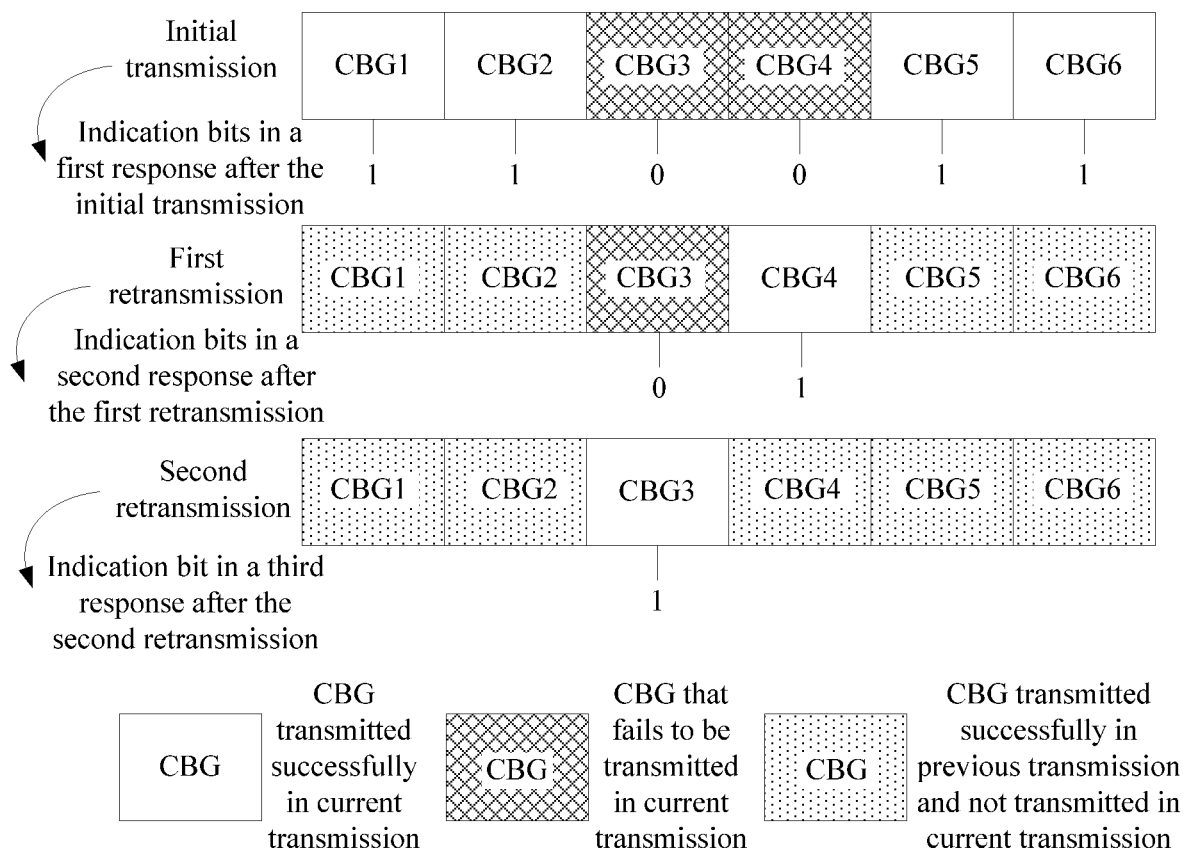
FIG. 3G is a schematic diagram of an example of a seventh communication method according to an embodiment of this application.
Figure 3H:
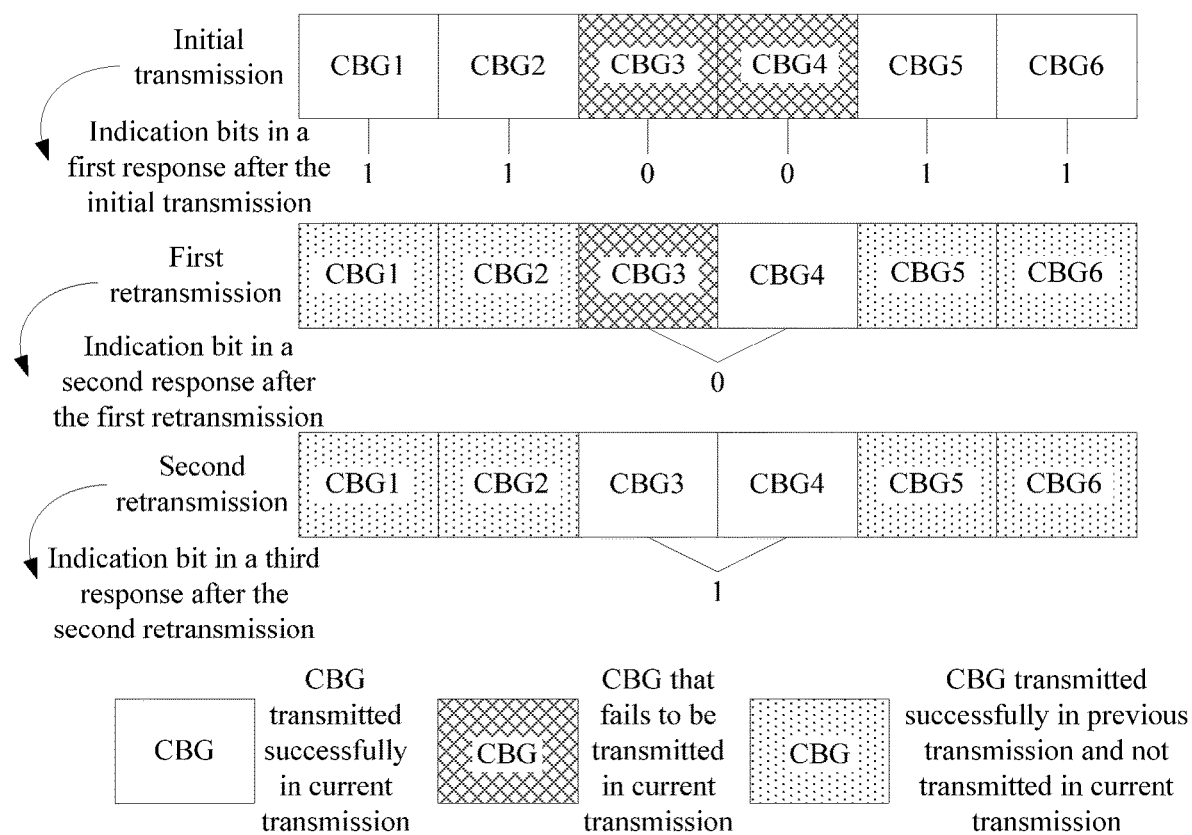
FIG. 3H is a schematic diagram of an example of an eighth communication method according to an embodiment of this application.

In the foregoing examples, a total data range indicated by a response sent after each transmission of the TB includes the six CBGs included in the TB. This application further provides an example. In this example, a total data range indicated by a response sent after each transmission of the TB includes all data in the current transmission, as shown in FIG. 3G; or a total data range indicated by a response sent after initial transmission of the TB includes the six CBGs, and a total data range indicated by a response sent after retransmission of the TB includes all data that fails to be transmitted in first retransmission, as shown in FIG. 3H.

The foregoing examples shown in FIG. 3A to FIG. 3H are examples when a transmission resource for each transmission of the TB is not pre-empted. When a transmission resource for r transmission of the TB is pre-empted, the first device needs to delete a CBG that is received and stored in the r transmission and that is transmitted on the pre-empted transmission resource. In addition, after $(r+1)^{th}$ transmission of the TB, the communications system may ignore pre-emption, and the first device still generates a response according to a response indication manner that is set by the communications system for the $(r+1)^{th}$ transmission of the TB. Alternatively, the communications system handles pre-emption, and the first device may generate a response including a second indication bit according to the solution in the foregoing embodiment, that is, the response includes an indication bit that indicates a transmission result of each CBG whose transmission resource is pre-empted.

To show a difference between responses sent for different transmissions after pre-emption, FIG. 3I to FIG. 3L illustrate examples of a communication method in which the first device ignores pre-emption and a communication method in which the first device handles pre-emption.

Example 7

In Example 7, the communications system sets a corresponding response indication manner for each transmission of the TB.

Figure 3I:
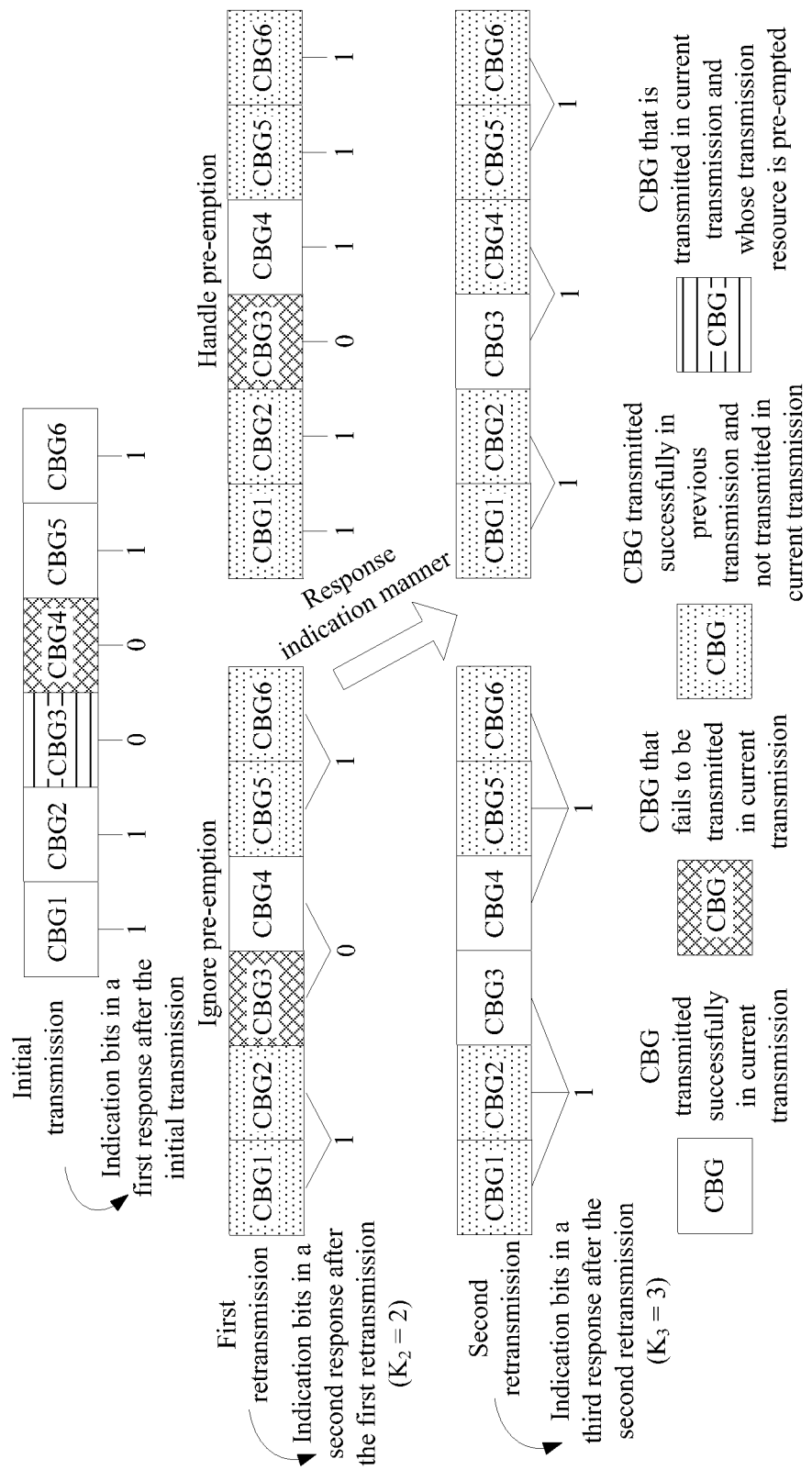
FIG. 3I is a schematic diagram of an example of a ninth communication method according to an embodiment of this application.

As shown in FIG. 3I, during initial transmission of the TB, the second device sends the six CBGs to the first device, a CBG4 in the six CBGs fails to be transmitted, and a CBG3 fails to be transmitted because a transmission resource for the CBG3 is pre-empted. In this case, the first device generates a first response after the initial transmission based on a transmission result of each of the six CBGs after the initial transmission, and sends the first response to the second device. The first response includes six indication bits. Values of the six indication bits are 110011.

When the communications system ignores pre-emption, refer to a diagram on the left of FIG. 3I:

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission and according to a response indication manner that is set for second transmission of the TB, and sends the second response to the second device. The second response includes three indication bits. Each indication bit indicates a transmission result of two CBGs in consecutive locations. Values of the three indication bits are 101.

After receiving the second response, the second device sends the CBG3 and the CBG4 to the first device based on the second response in second retransmission of the TB, and both the CBG3 and the CBG4 are transmitted successfully. In this case, the first device generates a third response for the second retransmission based on a transmission result of the six CBGs after the second retransmission and according to a response indication manner that is set for third transmission of the TB, and sends the third response to the second device. The third response includes two indication bits. Each indication bit indicates a transmission result of three CBGs in consecutive locations. Values of the two indication bits are 11.

When the communications system handles pre-emption, refer to a diagram on the right of FIG. 3I:

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission, and sends the second response to the second device. The second response includes six indication bits. Each indication bit indicates a transmission result of one of the six CBGs. Values of the six indication bits are 110111.

After receiving the second response, the second device sends the CBG3 to the first device based on the second response in second retransmission of the TB, and the CBG3 is transmitted successfully. In this case, the first device generates a third response for the second retransmission based on a transmission result of the six CBGs after the second retransmission and according to a response indication manner that is set for second transmission of the TB, and sends the third response to the second device. The third response includes three indication bits. Each indication bit indicates a transmission result of two CBGs in consecutive locations. Values of the three indication bits are 111.

Example 8

In Example 8, the communications system sets a corresponding response indication manner for each transmission of the TB.

Figure 3J:
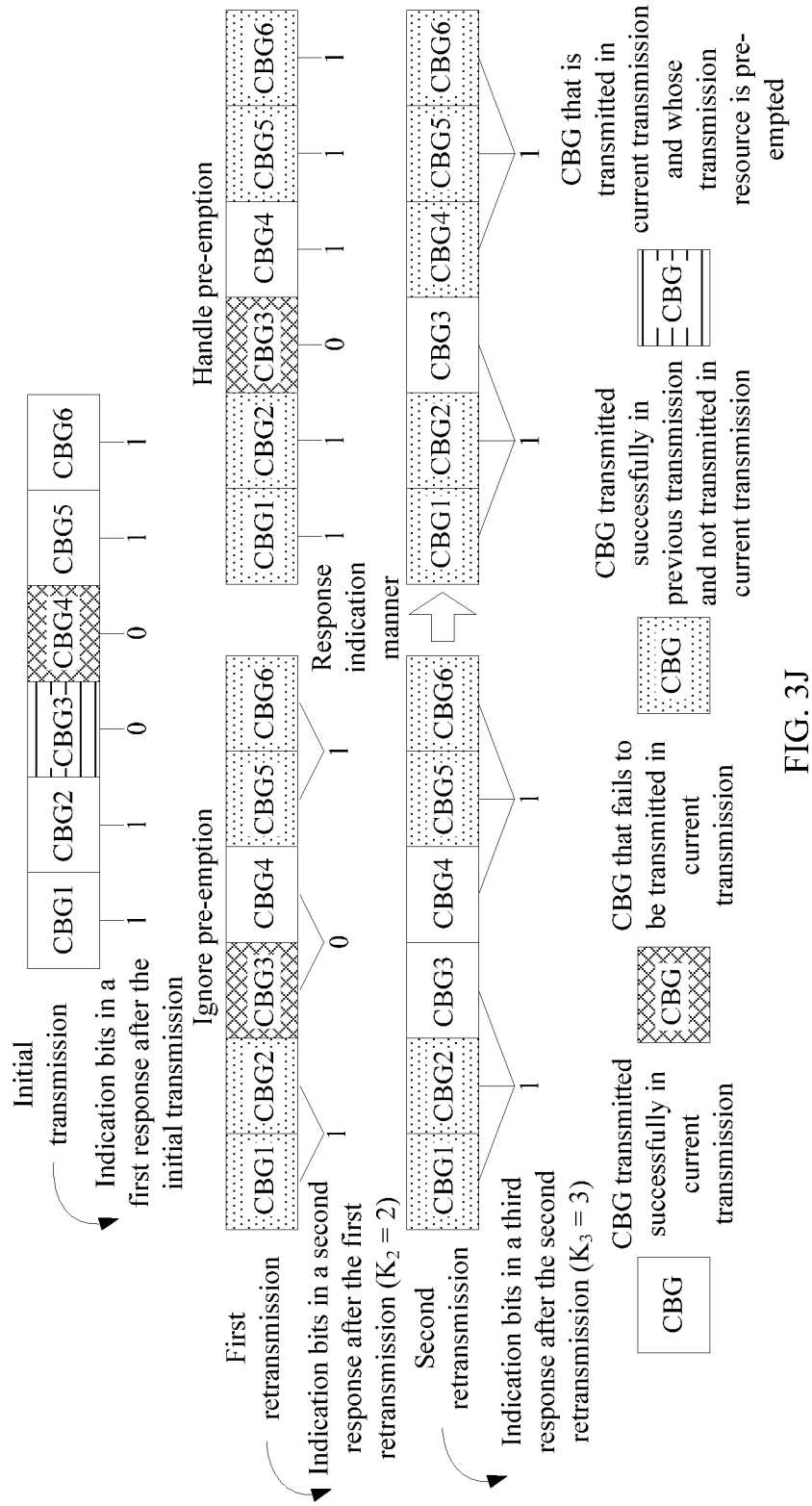
FIG. 3J is a schematic diagram of an example of a tenth communication method according to an embodiment of this application.

As shown in FIG. 3J, during initial transmission of the TB, the second device sends the six CBGs to the first device, a CBG4 in the six CBGs fails to be transmitted, and a CBG3 fails to be transmitted because a transmission resource for the CBG3 is pre-empted. In this case, the first device generates a first response after the initial transmission based on a transmission result of each of the six CBGs after the initial transmission, and sends the first response to the second device. The first response includes six indication bits. Values of the six indication bits are 110011.

When the communications system ignores pre-emption, a processing procedure is the same as that described in Example 7.

When the communications system handles pre-emption, refer to a diagram on the right of FIG. 3J:

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission, and sends the second response to the second device. The second response includes six indication bits. Each indication bit indicates a transmission result of one of the six CBGs. Values of the six indication bits are 110111.

After receiving the second response, the second device sends the CBG3 to the first device based on the second response in second retransmission of the TB, and the CBG3 is transmitted successfully. In this case, the first device generates a third response for the second retransmission based on a transmission result of the six CBGs after the second retransmission and according to a response indication manner that is set for third transmission of the TB, and sends the third response to the second device. The third response includes two indication bits. Each indication bit indicates a transmission result of three CBGs in consecutive locations. Values of the three indication bits are 11.

Example 9

In Example 9, the communications system sets a corresponding response indication manner for each transmission of the TB.

Figure 3K:
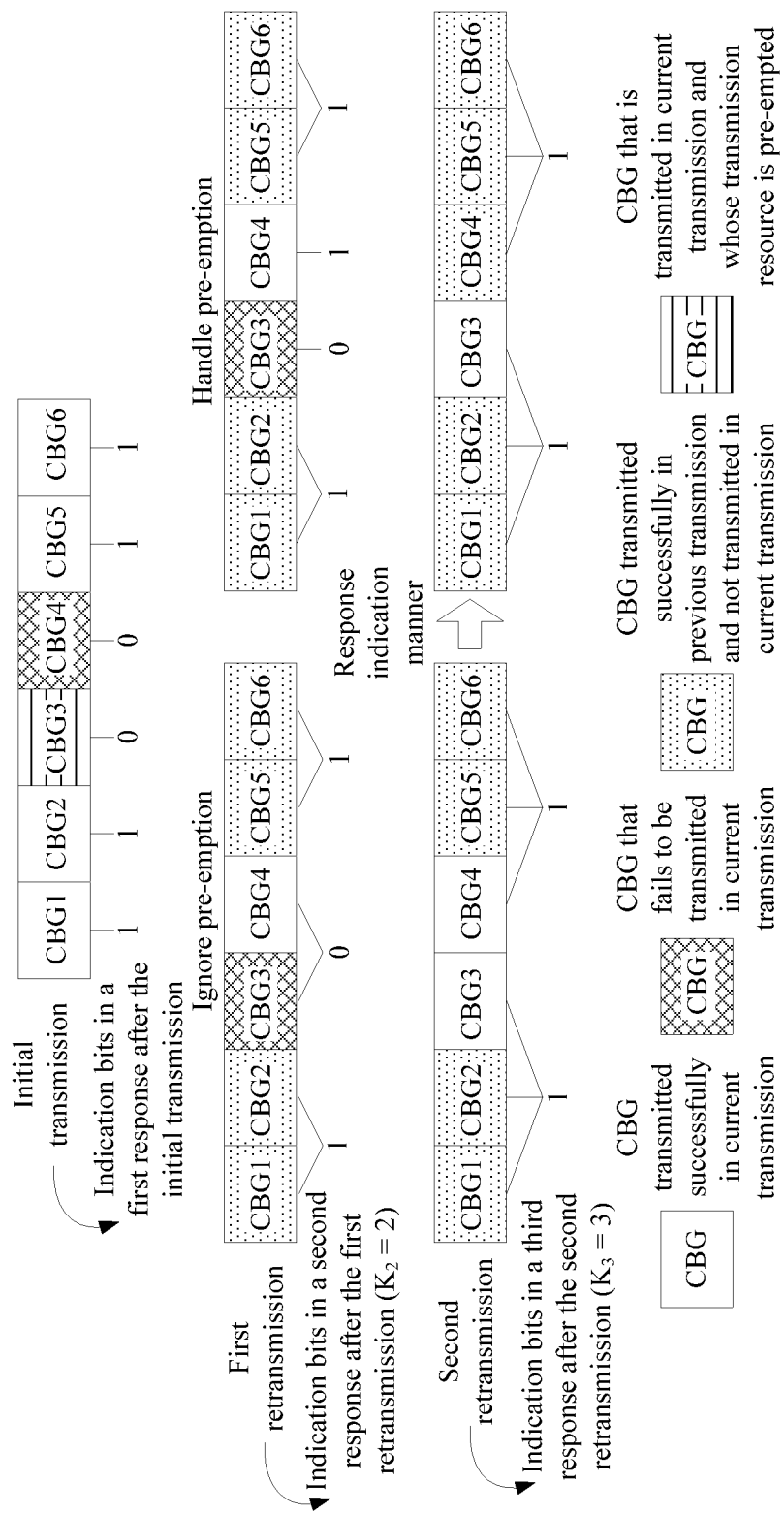
FIG. 3K is a schematic diagram of an example of an eleventh communication method according to an embodiment of this application.

As shown in FIG. 3K, during initial transmission of the TB, the second device sends the six CBGs to the first device, a CBG4 in the six CBGs fails to be transmitted, and a CBG3 fails to be transmitted because a transmission resource for the CBG3 is pre-empted. In this case, the first device generates a first response after the initial transmission based on a transmission result of each of the six CBGs after the initial transmission, and sends the first response to the second device. The first response includes six indication bits. Values of the six indication bits are 110011.

When the communications system ignores pre-emption, a processing procedure is the same as that described in Example 7.

When the communications system handles pre-emption, refer to a diagram on the right of FIG. 3K:

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission, and sends the second response to the second device.

In a response indication manner that is set for second transmission of the TB, the second response should include three indication bits, and each indication bit indicates two CBGs in consecutive locations. Therefore, when generating the second response, the first device cancels an indication bit indicating two CBGs that include the CBG3, and uses two indication bits to respectively indicate transmission results of the two CBGs indicated by the cancelled indication bit, as shown in the figure. Transmission results of other CBGs in the six CBGs are still indicated according to the response indication manner that is set for the second transmission of the TB. Therefore, in this example, the second response generated by the second device includes four indication bits. Two of the indication bits each indicate a transmission result of two CBGs in consecutive locations. The other two indication bits each indicate a transmission result of one CBG. Values of the four indication bits are 1011.

After receiving the second response, the second device sends the CBG3 to the first device based on the second response in second retransmission of the TB, and the CBG3 is transmitted successfully. In this case, the first device generates a third response for the second retransmission based on a transmission result of the six CBGs after the second retransmission and according to a response indication manner that is set for third transmission of the TB, and sends the third response to the second device. The third response includes two indication bits. Each indication bit indicates a transmission result of three CBGs in consecutive locations. Values of the three indication bits are 11.

Example 10

In Example 10, the communications system sets a corresponding response indication manner for each transmission of the TB.

Figure 3L:
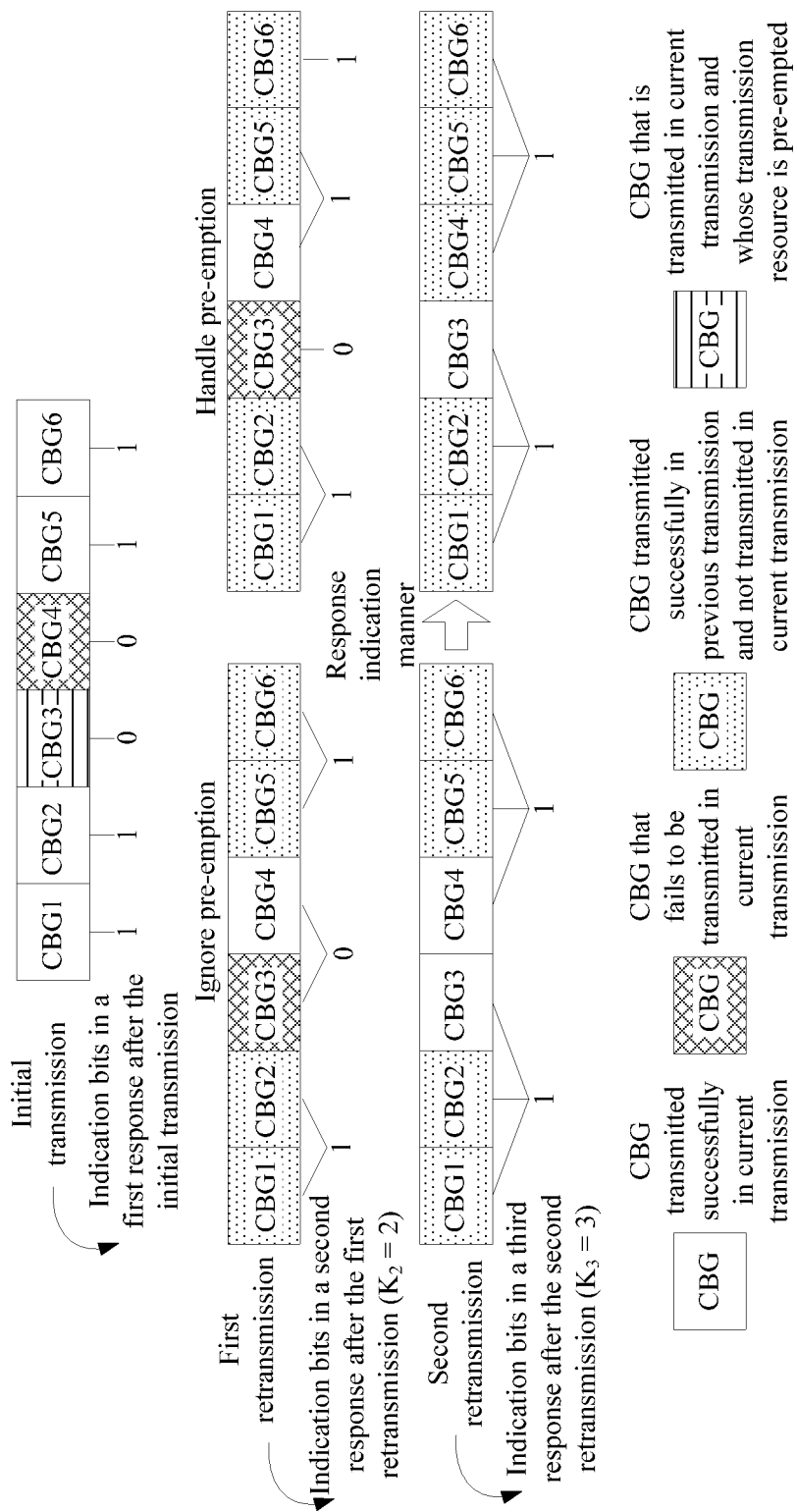
FIG. 3L is a schematic diagram of an example of a twelfth communication method according to an embodiment of this application.

As shown in FIG. 3L, during initial transmission of the TB, the second device sends the six CBGs to the first device, a CBG4 in the six CBGs fails to be transmitted, and a CBG3 fails to be transmitted because a transmission resource for the CBG3 is pre-empted. In this case, the first device generates a first response after the initial transmission based on a transmission result of each of the six CBGs after the initial transmission, and sends the first response to the second device. The first response includes six indication bits. Values of the six indication bits are 110011.

When the communications system ignores pre-emption, a processing procedure is the same as that described in Example 7.

When the communications system handles pre-emption, refer to a diagram on the right of FIG. 3L:

After receiving the first response, the second device sends the CBG3 and the CBG4 to the first device based on the first response in first retransmission of the TB, and the CBG3 fails to be transmitted again. In this case, the first device generates a second response for the first retransmission based on a transmission result of the six CBGs after the first retransmission, and sends the second response to the second device.

In a response indication manner that is set for second transmission of the TB, the second response should include three indication bits, and each indication bit indicates two CBGs in consecutive locations. When the first device generates the second response, a transmission result of the CBG3 is independently indicated by using one indication bit, and corresponding indication bits are generated for CBGs other than the CBG3 according to the response indication manner that is set for the second transmission of the TB, so as to generate the second response. Because only one CBG, namely, the CBG6, is finally left, a transmission result of the CBG6 is also independently indicated by using one indication bit. Therefore, in this example, the second response generated by the second device includes four indication bits. Two of the indication bits each indicate a transmission result of two CBGs in consecutive locations. The other two indication bits each indicate a transmission result of one CBG. Values of the four indication bits are 1011.

After receiving the second response, the second device sends the CBG3 to the first device based on the second response in second retransmission of the TB, and the CBG3 is transmitted successfully. In this case, the first device generates a third response for the second retransmission based on a transmission result of the six CBGs after the second retransmission and according to a response indication manner that is set for third transmission of the TB, and sends the third response to the second device. The third response includes two indication bits. Each indication bit indicates a transmission result of three CBGs in consecutive locations. Values of the three indication bits are 11.

In addition, it should be further noted that a sequence of indication bits included in each response is not limited in the foregoing examples provided in this application. In the foregoing examples, a sequence of indication bits in a response is set according to a sequence of indicated CBGs merely as an example.

Figure 4:
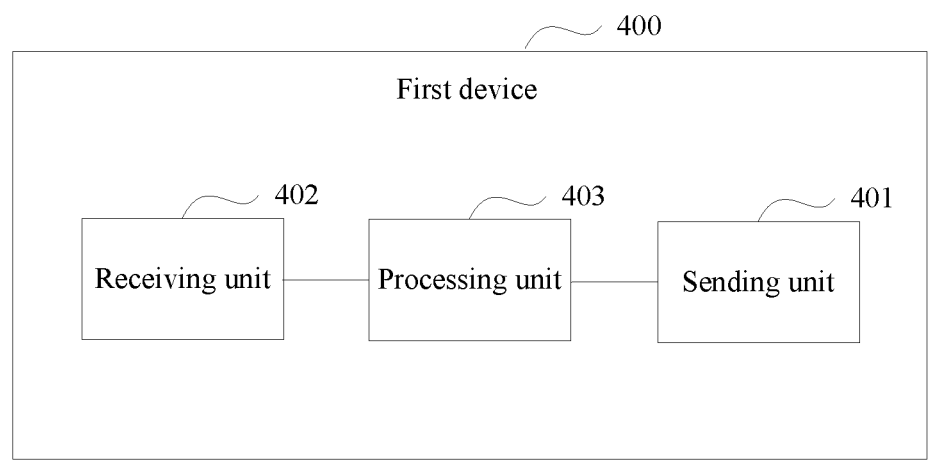
FIG. 4 is a structural diagram of a first device according to an embodiment of this application.

Based on the foregoing embodiments, this application further provides a first device. The first device may be applied to the communications system shown in FIG. 1, and configured to implement the communication method shown in FIG. 2. As shown in FIG. 4, the first device includes a sending unit 401, a receiving unit 402, and a processing unit 403.

The sending unit 401 is configured to send a first response to a second device.

The sending unit 401 is further configured to send a second response to the second device.

The first response and the second response are used to indicate a transmission result of target data.

An indication manner of the first response is different from an indication manner of the second response.

The processing unit 403 is configured to generate the first response and the second response.

Optionally, the receiving unit 402 is configured to:

receive first data from the second device before the first response is sent to the second device, where the first data is data in $X^{th}$ transmission of the target data, the first data includes some or all of the target data, the first response is used to indicate a transmission result of the target data after the $X^{th}$ transmission, and X is an integer greater than or equal to 1; and receive second data from the second device before the second response is sent to the second device, where the second data is data in $Y^{th}$ transmission of the target data, the second data includes some or all of the target data, the second response is used to indicate a transmission result of the target data after the $Y^{th}$ transmission, and Y is an integer greater than X.

Optionally, the first response includes $P_X$ indication bits, the $P_X$ indication bits are used to indicate a transmission result of the target data, the second response includes $P_Y$ indication bits, the $P_Y$ indication bits are used to indicate a transmission result of the target data, and both $P_X$ and $P_Y$ are positive integers.

That an indication manner of the first response is different from an indication manner of the second response includes:

$P_X$ and $P_Y$ are unequal; or $P_X$ and $P_Y$ are equal, and a k bit in the $P_X$ indication bits and a k bit in the $P_Y$ indication bits indicate transmission results of different parts of the target data, where k is a positive integer less than or equal to $P_X$.

Optionally, the target data includes N data blocks, where N is a positive integer;

the $P_X$ indication bits are used to indicate a transmission result of the N data blocks, where $P_X$ is less than or equal to N; and the $P_Y$ indication bits are used to indicate a transmission result of the N data blocks, where $P_Y$ is less than or equal to N.

Optionally, the $P_i$ indication bits include $Q_i$ first indication bits. Any first indication bit is used to indicate a transmission result of at least two of the N data blocks. i is equal to X or Y. $Q_i$ is a positive integer less than or equal to $P_i$.

Optionally, a quantity of data blocks indicated by at least one of the $Q_i$ first indication bits is different from a quantity of data blocks indicated by another first indication bit.

Optionally, each of the $Q_i$ first indication bits is used to indicate a transmission result of $K_i$ CBGs, $Q_i=N/K_i$, and $K_i$ is an integer greater than or equal to 2.

Optionally, the $P_i$ indication bits include $P_i-1$ first indication bits and an indication bit used to indicate a transmission result of $L_i$ data blocks, each of the $P_i-1$ first indication bits is used to indicate a transmission result of $K_i$ data blocks, $P_i = \lceil N/K_i \rceil$, $K_i$ is an integer greater than or equal to 2, and $L_i = N - K_i \times (P_i - 1)$; or $Q_i = Q_{i0} + Q_{i1}$, where each of the $Q_{i0}$ first indication bits is used to indicate a transmission result of $K_{i0}$ data blocks, each of the $Q_{i1}$ first indication bits is used to indicate a transmission result of $K_{i1}$ data blocks, both $Q_{i0}$ and $Q_{i1}$ are positive integers, $K_{i0}$ and $K_{i1}$ are integers greater than or equal to 2, and $K_{i0}$ and $K_{i1}$ are unequal.

Optionally, locations of at least two data blocks indicated by any first indication bit are nonconsecutive.

Optionally, the first data includes $M_X$ data blocks of the N data blocks, and $M_X$ is a positive integer less than or equal to N;

the receiving unit 402 is further configured to:

receive indication information from the second device before the first response is sent to the second device;

the processing unit 403 is further configured to determine $M_{X0}$ data blocks from the $M_X$ data blocks based on the indication information, where $M_{X0}$ is an integer greater than or equal to 0 and less than or equal to $M_X$; and the $P_X$ indication bits included in the first response include at least $M_{X0}$ second indication bits, and each of the $M_{X0}$ second indication bits is used to indicate a transmission result of one of the $M_{X0}$ data blocks.

Optionally, the indication information is discontinuous transmission information.

Optionally, an indication manner of any response is agreed on by the first device and the second device, or is sent by the second device to the first device.

This embodiment of this application provides the first device. The first device separately sends, to the second device, the responses used to indicate the transmission result of the target data: the first response and the second response, where the indication manner of the first response is different from the indication manner of the second response. In this solution, because indications of the two responses that are sent by the first device at different times and that are used to indicate transmission of the same target data may be different, this solution can improve flexibility of a response indication manner. Therefore, the communications system can flexibly adjust indication manners of responses sent at different times to ensure indication precision of the responses while reducing transmission resources of the responses.

Figure 5:
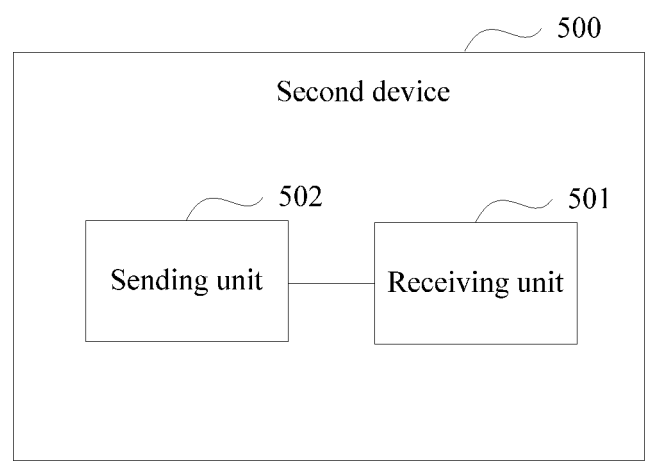
FIG. 5 is a structural diagram of a second device according to an embodiment of this application.

Based on the foregoing embodiments, this application further provides a second device. The second device may be applied to the communications system shown in FIG. 1, and configured to implement the communication method shown in FIG. 2. As shown in FIG. 5, the first device includes a receiving unit 501 and a sending unit 502.

The receiving unit 501 is configured to receive a first response from a first device.

The receiving unit 501 is configured to receive a second response from the first device.

The first response and the second response are used to indicate a transmission result of target data.

An indication manner of the first response is different from an indication manner of the second response.

Optionally, the sending unit 502 is configured to:

send first data to the first device before the first response is received from the first device, where the first data is data in $X^{th}$ transmission of the target data, the first data includes some or all of the target data, the first response is used to indicate a transmission result of the target data after the $X^{th}$ transmission, and X is an integer greater than or equal to 1; and send second data to the first device before the second response is received from the first device, where the second data is data in $Y^{th}$ transmission of the target data, the second data includes some or all of the target data, the second response is used to indicate a transmission result of the target data after the $Y^{th}$ transmission, and Y is an integer greater than X.

Optionally, the first response includes $P_X$ indication bits, the $P_X$ indication bits are used to indicate a transmission result of the target data, the second response includes $P_Y$ indication bits, the $P_Y$ indication bits are used to indicate a transmission result of the target data, and both $P_X$ and $P_Y$ are positive integers.

That an indication manner of the first response is different from an indication manner of the second response includes:

$P_X$ and $P_Y$ are unequal; or $P_X$ and $P_Y$ are equal, and a k bit in the $P_X$ indication bits and a k bit in the $P_Y$ indication bits indicate transmission results of different parts of the target data, where k is a positive integer less than or equal to $P_X$.

Optionally, the target data includes N data blocks, where N is a positive integer;

the $P_X$ indication bits are used to indicate a transmission result of the N data blocks, where $P_X$ is less than or equal to N; and the $P_Y$ indication bits are used to indicate a transmission result of the N data blocks, where $P_Y$ is less than or equal to N.

Optionally, the $P_i$ indication bits include $Q_i$ first indication bits. Any first indication bit is used to indicate a transmission result of at least two of the N data blocks. i is equal to X or Y. $Q_i$ is a positive integer less than or equal to $P_i$.

Optionally, a quantity of data blocks indicated by at least one of the $Q_i$ first indication bits is different from a quantity of data blocks indicated by another first indication bit.

Optionally, each of the $Q_i$ first indication bits is used to indicate a transmission result of $K_i$ CBGs, $Q_i=N/K_i$, and $K_i$ is an integer greater than or equal to 2.

Optionally, the $P_i$ indication bits include $P_i-1$ first indication bits and an indication bit used to indicate a transmission result of $L_i$ data blocks, each of the $P_i-1$ first indication bits is used to indicate a transmission result of $K_i$ data blocks, $P_i=\lceil N/K_i \rceil$, $K_i$ is an integer greater than or equal to 2, and $L_i=N-K_i\times(P_i-1)$; or $Q_i=Q_{i0}+Q_{i1}$, where each of the $Q_{i0}$ first indication bits is used to indicate a transmission result of $K_{i0}$ data blocks, each of the $Q_{i1}$ first indication bits is used to indicate a transmission result of $K_{i1}$ data blocks, both $Q_{i0}$ and $Q_{i1}$ are positive integers, $K_{i0}$ and $K_{i1}$ are integers greater than or equal to 2, and $K_{i0}$ and $K_{i1}$ are unequal.

Optionally, locations of at least two data blocks indicated by any first indication bit are nonconsecutive.

Optionally, the first data includes $M_X$ data blocks of the N data blocks, and $M_X$ is a positive integer less than or equal to N;

the sending unit 502 is further configured to send indication information to the first device before the first response is received from the first device, where the indication information is used to determine $M_{X0}$ data blocks from the $M_X$ data blocks, and $M_{X0}$ is an integer greater than or equal to 0 and less than or equal to $M_X$; and the $P_X$ indication bits included in the first response include at least $M_{X0}$ second indication bits, and each of the $M_{X0}$ second indication bits is used to indicate a transmission result of one of the $M_{X0}$ data blocks.

Optionally, the indication information is discontinuous transmission indication information.

Optionally, an indication manner of any response is agreed on by the first device and the second device, or is sent by the second device to the first device.

This embodiment of this application provides the second device. The second device separately receives, from the first device, the responses used to indicate the transmission result of the target data: the first response and the second response, where the indication manner of the first response is different from the indication manner of the second response. In this solution, because indications of the two responses that are sent by the first device at different times and that are used to indicate transmission of the same target data may be different, this solution can improve flexibility of a response indication manner. Therefore, the communications system can flexibly adjust indication manners of responses sent at different times to ensure indication precision of the responses while reducing transmission resources of the responses.

It should be noted that the module division in the embodiments of this application is an example, is merely logical function division, and may be other division in actual implementation. In addition, functional units in the embodiments of this application may be integrated into one processing unit, or each of the units may exist alone physically, or at least two units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Figure 6:
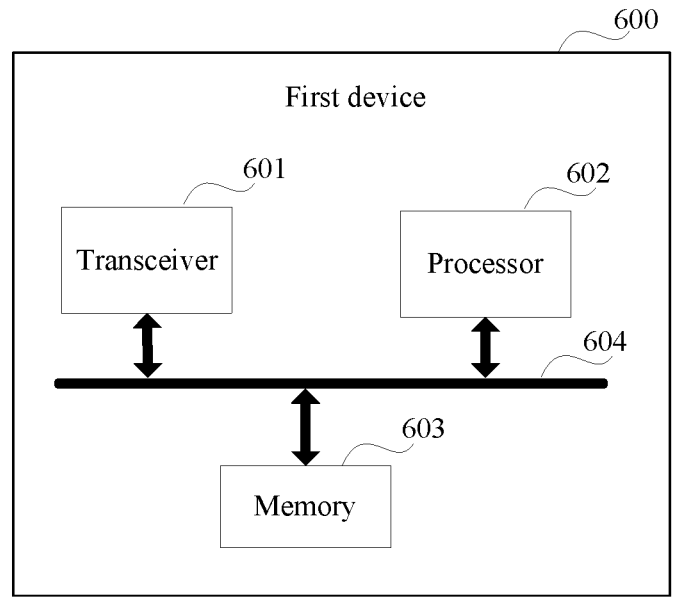
FIG. 6 is a structural diagram of another first device according to an embodiment of this application.

Based on the foregoing embodiments, an embodiment of this application further provides a first device. The first device may be applied to the communications system shown in FIG. 1, and configured to implement the communication method shown in FIG. 2. The first device has functions similar to those of the first device 400 shown in FIG. 4. As shown in FIG. 6, the first device 600 includes a transceiver 601, a processor 602, and a memory 603. The transceiver 601, the processor 602, and the memory 603 are connected to each other.

Optionally, the transceiver 601, the processor 602, and the memory 603 are connected to each other through a bus 604. The bus 604 may be a peripheral component interconnect (PCI) bus, an extended industry standard architecture (EISA) bus, and or the like. The bus may be classified into an address bus, a data bus, a control bus, and the like. For ease of representation, only one thick line is used to represent the bus in FIG. 6, but this does not mean that there is only one bus or only one type of bus.

The transceiver 601 is configured to send and receive data, to implement communication with another device in the communications system.

The processor 602 is configured to implement the communication method provided in the embodiment shown in FIG. 2. For details, refer to the descriptions in the foregoing embodiments. Details are not described herein again.

The memory 603 is configured to store a computer program, an instruction, or the like. Specifically, the computer program or the instruction may include program code. The program code includes a computer operation instruction. The memory 603 may include a random access memory (RAM), or may include a non-volatile memory, for example, at least one magnetic disk memory. The processor 602 executes the computer program or the instruction stored in the memory 603, to implement the foregoing functions, so as to implement the communication method provided in the foregoing embodiments.

Figure 7:
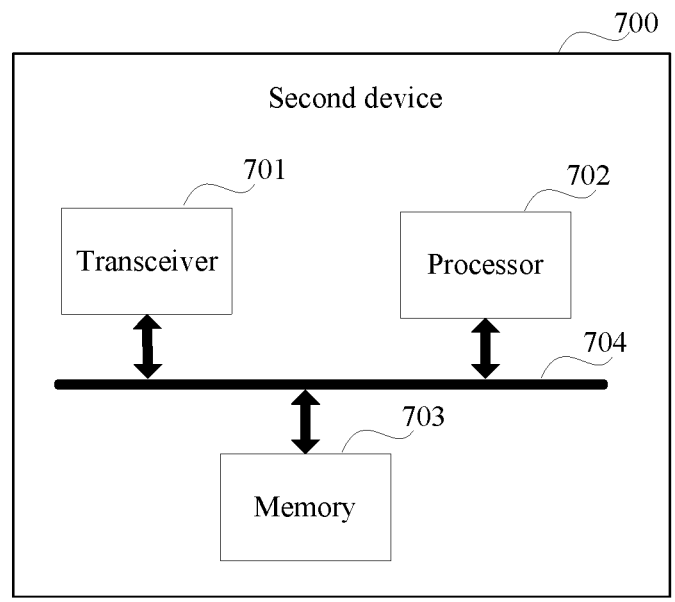
FIG. 7 is a structural diagram of another second device according to an embodiment of this application.

Based on the foregoing embodiments, an embodiment of this application further provides a second device. The second device may be applied to the communications system shown in FIG. 1, and configured to implement the communication method shown in FIG. 2. The second device has functions similar to those of the second device 500 shown in FIG. 5. As shown in FIG. 7, the second device 700 includes a transceiver 701, a processor 702, and a memory 703. The transceiver 701, the processor 702, and the memory 703 are connected to each other.

Optionally, the transceiver 701, the processor 702, and the memory 703 are connected to each other through a bus 704. The bus 704 may be a PCI bus, an EISA bus, or the like. The bus may be classified into an address bus, a data bus, a control bus, and the like. For ease of representation, only one thick line is used to represent the bus in FIG. 7, but this does not mean that there is only one bus or only one type of bus.

The transceiver 701 is configured to send and receive data, to implement communication with another device in the communications system.

The processor 702 is configured to implement the communication method provided in the embodiment shown in FIG. 2. For details, refer to the descriptions in the foregoing embodiments. Details are not described herein again.

The memory 703 is configured to store a computer program, an instruction, or the like. Specifically, the computer program or the instruction may include program code. The program code includes a computer operation instruction. The memory 703 may include a RAM, or may include a non-volatile memory, for example, at least one magnetic disk memory. The processor 702 executes the computer program or the instruction stored in the memory 703, to implement the foregoing functions, so as to implement the communication method provided in the foregoing embodiments.

Based on the foregoing embodiments, an embodiment of this application further provides a communications system. The communications system includes a first device and a second device that are configured to implement the communication method shown in FIG. 2.

To sum up, the embodiments of this application provide the communication method and the communications device. In the method, the first device in the communications system separately sends, to the second device, the responses used to indicate the transmission result of the target data: the first response and the second response, where the indication manner of the first response is different from the indication manner of the second response. In this solution, because indications of the two responses that are sent by the first device at different times and that are used to indicate transmission of the same target data may be different, this solution can improve flexibility of a response indication manner. Therefore, the communications system can flexibly adjust indication manners of responses sent at different times to ensure indication precision of the responses while reducing transmission resources of the responses.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
   sending, by a first device, a first response to a second device; and
   sending, by the first device, a second response to the second device, wherein
   the first response and the second response are used to indicate a transmission result of target data, the target data comprising N data blocks, wherein N is a positive integer; and
   an indication manner of the first response is different from an indication manner of the second response;
   wherein the first response comprises $P_X$ indication bits, the $P_X$ indication bits are used to indicate the transmission result of the N data blocks, wherein $P_X$ is less than N, the second response comprises $P_Y$ indication bits, the $P_Y$ indication bits are used to indicate the transmission result of the N data blocks, wherein $P_Y$ is less than N, and $P_X$ and $P_Y$ are positive integers; and
   the indication manner of the first response is different from the indication manner of the second response comprises:
   $P_X$ and $P_Y$ are unequal; and
   Pi indication bits comprise Qi first indication bits, any first indication bit is used to indicate a transmission result of at least two of the N data blocks, i is equal to X or Y, and Qi is a positive integer less than or equal to Pi.

2. The method according to claim 1, further comprising:
   before the first device sends the first response to the second device:
   receiving, by the first device, first data from the second device, wherein the first data is data in $X^{th}$ transmission of the target data, the first data comprises at least some of the target data, the first response is used to indicate a transmission result of the target data after the $X^{th}$ transmission, and X is an integer greater than or equal to 1; and
   before the first device sends the second response to the second device:
   receiving, by the first device, second data from the second device, wherein the second data is data in $Y^{th}$ transmission of the target data, the second data comprises at least some of the target data, the second response is used to indicate a transmission result of the target data after the $Y^{th}$ transmission, and Y is an integer greater than X.

3. The method according to claim 1, wherein a quantity of data blocks indicated by at least one of the $Q_i$ first indication bits is different from a quantity of data blocks indicated by another first indication bit.

4. The method according to claim 1, wherein each of the $Q_i$ first indication bits is used to indicate a transmission result of $K_i$ CBGs, $Q_i=N/K_i$, and $K_i$ is an integer greater than or equal to 2.

5. The method according to claim 1, wherein the $P_i$ indication bits comprise $P_i-1$ first indication bits and an indication bit used to indicate a transmission result of $L_i$ data blocks, each of the $P_i-1$ first indication bits is used to indicate a transmission result of $K_i$ data blocks, $P_i-1$ first indication bits and the indication bit used to indicate a transmission result of $L_i$ data blocks, each of the $P_i-1$ first indication bits is used to indicate a transmission result of $K_i$ data blocks, $P_i=\lceil N/K_i \rceil$, $K_i$ is an integer greater than or equal to 2, and $L_i=N-K_i\times(P_i-1)$; or
   $Q_i=Q_{i0}+Q_{i1}$, wherein each of the $Q_{i0}$ first indication bits is used to indicate a transmission result of $K_{i0}$ data blocks, each of the $Q_{i1}$ first indication bits is used to indicate a transmission result of $K_{i1}$ data blocks, both $Q_{i0}$ and $Q_{i1}$ are positive integers, $K_{i0}$ and $K_{i1}$ are integers greater than or equal to 2, and $K_{i0}$ and $K_{i1}$ are unequal.

6. The method according to claim 1, wherein locations of at least two data blocks indicated by any first indication bit are nonconsecutive.

7. The method according to claim 1, wherein the first data comprises $M_X$ data blocks of the N data blocks, and $M_X$ is a positive integer less than or equal to N; and before the first device sends the first response to the second device:
  receiving, by the first device, indication information from the second device, and determining $M_{X0}$ data blocks from the $M_X$ data blocks based on the indication information, wherein $M_{X0}$ is an integer greater than or equal to 0 and less than or equal to $M_X$; and
the $P_X$ indication bits comprised in the first response comprise at least $M_{X0}$ second indication bits, and each of the $M_{X0}$ second indication bits is used to indicate a transmission result of one of the $M_{X0}$ data blocks.

8. A communication method, comprising:
receiving, by a second device, a first response from a first device; and
receiving, by the second device, a second response from the first device, wherein
the first response and the second response are used to indicate a transmission result of target data, the target data comprising N data blocks, wherein N is a positive integer; and
an indication manner of the first response is different from an indication manner of the second response; and
wherein the first response comprises $P_X$ indication bits, the $P_X$ indication bits are used to indicate a transmission result of the N data blocks, wherein $P_X$ is less than N, the second response comprises $P_Y$ indication bits, the $P_Y$ indication bits are used to indicate the transmission result of the N data blocks, wherein $P_y$ is less than N, and $P_X$ and $P_Y$ are positive integers; and
the indication manner of the first response is different from the indication manner of the second response comprises:
  $P_X$ and $P_Y$ are unequal; and
  Pi indication bits comprise Qi first indication bits, any first indication bit is used to indicate a transmission result of at least two of the N data blocks, i is equal to X or Y, and Qi is a positive integer less than or equal to Pi.

9. The method according to claim 8, further comprising:
before the second device receives the first response from the first device:
  sending, by the second device, first data to the first device, wherein the first data is data in $X^{th}$ transmission of the target data, the first data comprises at least some of the target data, the first response is used to indicate a transmission result of the target data after the $X^{th}$ transmission, and X is an integer greater than or equal to 1; and
before the second device receives the second response from the first device:
  sending, by the second device, second data to the first device, wherein the second data is data in $Y^{th}$ transmission of the target data, the second data comprises at least some of the target data, the second response is used to indicate a transmission result of the target data after the $Y^{th}$ transmission, and Y is an integer greater than X.

10. The method according to claim 8, wherein a quantity of data blocks indicated by at least one of the $Q_i$ first indication bits is different from a quantity of data blocks indicated by another first indication bit; or
wherein each of the $Q_i$ first indication bits is used to indicate a transmission result of $K_i$ CBGs, $Q_i=N/K_i$, and $K_i$ is an integer greater than or equal to 2; or,
wherein the $P_i$ indication bits comprise $P_i-1$ first indication bits and an indication bit used to indicate a transmission result of $L_i$ data blocks, each of the $P_i-1$ first indication bits is used to indicate a transmission result of $K_i$ data blocks, $P_i=\lceil N/K_i \rceil$, $K_i$ is an integer greater than or equal to 2, and $L_i=N-K_i \times (P_i-1)$; or
$Q_i=Q_{i0}+Q_{i1}$, wherein each of the $Q_{i0}$ first indication bits is used to indicate a transmission result of $K_{i0}$ data blocks, each of the $Q_{i1}$ first indication bits is used to indicate a transmission result of $K_{i1}$ data blocks, both $Q_{i0}$ and $Q_{i1}$ are positive integers, $K_{i0}$ and $K_{i1}$ are integers greater than or equal to 2, and $K_{i0}$ and $K_{i1}$ are unequal.

11. The method according to claim 8, wherein locations of at least two data blocks indicated by any first indication bit are nonconsecutive.

12. The method according to claim 8, wherein the first data comprises $M_X$ data blocks of the N data blocks, and $M_X$ is a positive integer less than or equal to N; and
before the second device receives the first response from the first device:
  sending, by the second device, indication information to the first device, wherein the indication information is used to determine $M_{X0}$ data blocks from the $M_X$ data blocks, and $M_{X0}$ is an integer greater than or equal to 0 and less than or equal to $M_X$; and
the $P_X$ indication bits comprised in the first response comprise at least $M_{X0}$ second indication bits, and each of the $M_{X0}$ second indication bits is used to indicate a transmission result of one of the $M_{X0}$ data blocks.

13. The method according to claim 12, wherein the indication information is discontinuous transmission indication information; or
wherein an indication manner of any response is agreed on by the first device and the second device, or is sent by the second device to the first device.

14. A first device, comprising:
a transceiver;
a processor; and
a memory, wherein
the memory is configured to store a computer program;
the transceiver is configured to send and receive data; and
the processor is configured to execute the computer program and provide execution comprising:
  sending, by the first device, a first response to a second device; and
  sending, by the first device, a second response to the second device, wherein
  the first response and the second response are used to indicate a transmission result of target data, the target data comprising N data blocks, wherein N is a positive integer; and
  an indication manner of the first response is different from an indication manner of the second response;
  wherein the first response comprises $P_X$ indication bits, the $P_X$ indication bits are used to indicate a transmission result of the N data blocks, wherein $P_X$ is less than N, the second response comprises $P_y$ indication bits, the $P_y$ indication bits are used to indicate the transmission result of the N data blocks, wherein $P_y$ is less than N, and $P_X$ and $P_y$ are positive integers; and
the indication manner of the first response is different from the indication manner of the second response comprises:
  $P_X$ and $P_y$ are unequal; and
  Pi indication bits comprise Qi first indication bits, any first indication bit is used to indicate a transmission result of at least two of the N data blocks, i is equal to X or Y, and Qi is a positive integer less than or equal to Pi.

15. The communication method according to claim 1, wherein the indication manner can be adjusted at different times of communication between the first device and the second device.

16. The communication method according to claim 1, further comprising:
sending, by the first device, a third response to the second device, wherein
an indication manner of the third response is different from the indication manner of the first response, and
the indication manner of the third response is different from the indication manner of the second response.

* * * * *